United States Patent
Couelier et al.

(10) Patent No.: US 12,360,662 B2
(45) Date of Patent: Jul. 15, 2025

(54) SYSTEM AND METHOD FOR MULTIPLE INPUT MANAGEMENT

(71) Applicant: MyScript, Nantes (FR)

(72) Inventors: Joel Couelier, Nantes (FR); Denis Manceau, Nantes (FR)

(73) Assignee: MyScript, Nantes (FR)

( * ) Notice: Subject to any disclaimer, the term of this patent is extended or adjusted under 35 U.S.C. 154(b) by 0 days.

(21) Appl. No.: 15/132,514

(22) Filed: Apr. 19, 2016

(65) Prior Publication Data
US 2017/0242581 A1   Aug. 24, 2017

(30) Foreign Application Priority Data
Feb. 23, 2016   (EP) .................................... 16290042

(51) Int. Cl.
*G06F 3/04886*   (2022.01)
*G06F 3/04883*   (2022.01)
(Continued)

(52) U.S. Cl.
CPC ...... *G06F 3/04886* (2013.01); *G06F 3/04883* (2013.01); *G06F 40/274* (2020.01); *G06F 40/279* (2020.01); *G06F 2203/04808* (2013.01)

(58) Field of Classification Search
CPC .............. G06F 3/04883; G06F 17/276; G06F 17/2765; G06F 3/04886; G06F 40/279; G06F 40/274; G06F 2203/04808
See application file for complete search history.

(56) References Cited

U.S. PATENT DOCUMENTS 5,838,302 A * 11/1998 Kuriyama ........... G06F 3/04883
                                                                    345/156
6,661,920 B1   12/2003 Skinner
(Continued)

FOREIGN PATENT DOCUMENTS

CN           102109954        6/2011
CN           102193736        9/2011
(Continued)

OTHER PUBLICATIONS

International Search Report issued for PCT/EP2017/000245 mailed Jun. 19, 2017 (5 pages).
(Continued)

*Primary Examiner* — Stephen S Hong
*Assistant Examiner* — Carl E Barnes, Jr.
(74) *Attorney, Agent, or Firm* — McDermott Will & Emery LLP

(57) ABSTRACT

A system, method and computer program product for use in recognizing input of multiple input types on a computing device are provided. The computing device is connected to an input device in the form of an input surface. A user is able to provide input by applying pressure to or gesturing above the input surface using either his or her finger or an instrument such as a stylus or pen. The computing device further has an input management system for recognizing the input. The input management system is configured to accept input, with respect to the interface surface, of one or more different types of input, cause recognition of the input as recognized objects regardless of the one or more input types, each recognized object being associated with a corresponding probability of recognition, and return at least one of the recognized objects as the recognized input based on the probabilities.

9 Claims, 16 Drawing Sheets

(51) Int. Cl.
    *G06F 40/274*     (2020.01)
    *G06F 40/279*     (2020.01)

(56) References Cited

U.S. PATENT DOCUMENTS

| | | | |
|---|---|---|---|
| 6,788,815 B2 | 9/2004 | Lui et al. | |
| 7,496,513 B2 | 2/2009 | Soong et al. | |
| 7,571,384 B1* | 8/2009 | Webb | G06F 3/04883 715/268 |
| 8,276,101 B2* | 9/2012 | Li | G06K 9/00416 345/173 |
| 8,600,746 B1* | 12/2013 | Lei | G10L 15/22 704/235 |
| 8,881,269 B2 | 11/2014 | Fleizach et al. | |
| 9,104,312 B2* | 8/2015 | Kay | G06F 3/04883 |
| 9,165,257 B2* | 10/2015 | Badger | G06F 16/35 |
| 9,911,052 B2* | 3/2018 | Wimmer | G06V 30/2268 |
| 2003/0038788 A1* | 2/2003 | Demartines | G06F 3/0485 345/173 |
| 2004/0071344 A1* | 4/2004 | Lui | G06F 3/038 382/181 |
| 2008/0215308 A1* | 9/2008 | Li | G06F 40/274 704/3 |
| 2012/0117506 A1* | 5/2012 | Koch | G06F 3/04886 715/773 |
| 2013/0046544 A1* | 2/2013 | Kay | G06F 16/3322 704/275 |
| 2013/0120274 A1* | 5/2013 | Ha | G06F 3/04883 345/168 |
| 2014/0160032 A1* | 6/2014 | Che | G06F 3/04886 345/173 |
| 2014/0281995 A1 | 9/2014 | Kim et al. | |
| 2014/0365949 A1* | 12/2014 | Xia | G06K 9/00436 715/780 |
| 2015/0043824 A1* | 2/2015 | Akhavan Fomani | G06V 30/32 382/188 |
| 2015/0193141 A1* | 7/2015 | Goldsmith | G06F 3/04883 345/173 |
| 2015/0293602 A1* | 10/2015 | Kay | G06F 3/04883 715/752 |
| 2017/0147149 A1* | 5/2017 | Zotov | G06F 3/0418 |
| 2018/0173415 A1* | 6/2018 | Xia | G06K 9/00436 |
| 2022/0270385 A1* | 8/2022 | Sahu | G06F 40/279 |

FOREIGN PATENT DOCUMENTS

| | | | |
|---|---|---|---|
| CN | 102193736 A | * | 9/2011 |
| CN | 103106024 A | | 5/2013 |
| JP | 2012238108 A | | 12/2012 |
| JP | 2013522972 A | | 6/2013 |
| WO | 2013017045 | | 2/2013 |
| WO | 2014045414 | | 3/2014 |
| WO | 2015075487 | | 5/2015 |

OTHER PUBLICATIONS

Written Opinion of the International Searching Authority issued for PCT/EP2017000245 mailed Jun. 19, 2017 (10 pages).
Official Notice of Rejection mailed Feb. 16, 2021 in Japanese Patent Application No. 2018-542741, with English Translation.
First Office Action issued Jan. 18, 2021 in Chinese Application No. 201780013032.7, with English translation.

* cited by examiner

SYSTEM AND METHOD FOR MULTIPLE INPUT MANAGEMENT

CROSS REFERENCE TO RELATED APPLICATIONS

This application claims priority to European Application No. 16290042.7 filed on Feb. 23, 2016, the entire contents of which are incorporated herein.

TECHNICAL FIELD

The present description relates generally to the field of computer input systems and methods using computing device interfaces. The present description relates more specifically to systems and methods for multi-modal input of typing and handwriting via a user interface for recognition.

BACKGROUND

Computing devices continue to become more ubiquitous to daily life. They take the form of computer desktops, laptop computers, tablet computers, hybrid computers (2-in-1s), e-book readers, mobile phones, smartphones, wearable computers (including smartwatches, smart glasses/headsets), global positioning system (GPS) units, enterprise digital assistants (EDAs), personal digital assistants (PDAs), game consoles, and the like. Further, computing devices are being incorporated into vehicles and equipment, such as cars, trucks, farm equipment, manufacturing equipment, building environment control (e.g., lighting, HVAC), and home and commercial appliances.

Computing devices generally consist of at least one processing element, such as a central processing unit (CPU), some form of memory, and input and output devices. The variety of computing devices and their subsequent uses necessitate a variety of interfaces and input devices. One such input device is a touch sensitive surface such as a touch screen or touch pad wherein user input is received through contact between the user's finger or an instrument such as a pen or stylus and the touch sensitive surface. Another input device is an input surface that senses gestures made by a user above the input surface. A further input device is a position detection system which detects the relative position of either touch or non-touch interactions with a non-touch physical or virtual surface. Any of these methods of input can be used generally for input through interaction with a displayed (virtual) keyboard or through drawing or writing. When user input is drawn or written, the user's handwriting is typically interpreted using a handwriting recognition system or method.

Virtual or 'soft' keyboards are widely used now and many options and applications beyond those that come standard with portable (and non-portable) computing devices are available, particularly for complex languages, such as those having many characters beyond those easily placed on a single keyboard panel or layout, and for non-text characters, such as numbers, symbols and messaging characters (e.g., emoticons or "emojis"). The need for users to access characters additional to just the standard or most commonly used characters, coupled with the often small screen size of portable devices, like smartphones and phablets, means that several keyboards are usually provided and accessible to users through multiple and/or hierarchal selections. This conventional layered keyboard approach disrupts the creative flow of users in inputting content to the device and reduces productivity since the insertion of particular characters is complex and typically requires many actions to be taken in succession and a relatively high level of knowledge and capability of users. For example, for the entry of a 'special' character, like an emoji, on certain available keyboards up to five interactions or taps, on the keyboard are required for input of just a single special character.

Further, use of virtual keyboards is generally suited for input environments where users are able to concentrate on the input tool and what they are entering therewith. Due to the portability of modern devices and use of many different devices by users, there is a growing need to allow input (of content in particular) in many environments, some of which are not conducive to allowing such concentration. For example, many users of portable devices, such as smartphones, input content whilst walking causing difficulty for typing whilst viewing the device screen, or in automobiles users cannot view an input surface whilst driving. Such content input situations could be handled with voice input, for example. However, many environments do not allow effective use of voice input, such as in noisy or intrinsically quiet situations or situations in which users do not wish to be overheard.

There are many applications of handwriting recognition in portable computing devices like smartphones, phablets and tablets, such as is in note taking, document annotation, mathematical equation input and calculation, music symbol input, sketching and drawing. These types of input are usually performed by the user launching a handwriting input application on the computing device which accepts and interprets, either locally in the device or remotely via a communications link of the device, handwritten input on the touch sensitive surface and displays or otherwise renders this input as so-called 'digital ink'. It may be possible to use such handwriting input in place of keyboards on such devices in order to allow special character input or input in conditions non-conducive to typing as handwriting can generally be performed without looking. However, the Applicant has found that users do not like using handwriting extensively on electronic devices, particular those with smaller screens, such as smartphones and phablets, particularly when a relatively large amount of content is to be input, e.g., the writing of an email message versus a Twitter® message. This is exacerbated by the manner of handwriting entry currently available and contemplated for digital handwriting applications, in which a limited amount of content can be input in a relatively short timeframe. For example, US Patent Application Publication No. US 2015/0193141 describes a relatively complex handwriting input panel for entry of multiple characters making up words and sentences.

Alternatively, handwriting could be used to supplement keyboard input by providing relatively fast input of single or few text and non-text characters, particularly those that are not present on initial keyboard panels. Such a combination of keyboard and handwriting input also aides the above mobile input scenarios, such as when content input is begun in an environment conducive to typing (and voice), such as on a desktop or laptop PC in an office, and then continued in a non-conducive environment, such as in a vehicle, like a car or airplane. Such multiple entry systems have been proposed. For example, U.S. Pat. No. 6,661,920 describes a system for accepting input from keyboard and handwriting and U.S. Pat. No. 6,788,815 describes a system for accepting input from keyboard and handwriting, and from speech. In both of these patents, discrete input panels are used for the entry of typing and handwriting. Accordingly, while these patents allow 'simultaneous' keyboard and handwritten input, there is a need to provide individual input areas on the interface surface of the computing device, which is clearly not much of an improvement over the current multiple keyboard model, particularly on smaller screen devices.

Alternatively still, PCT Pamphlet No. WO 2013/017045 describes a system in which switching between keyboard and handwriting entry is provided through a handwriting gesture. This may provide a better approach for smaller screen devices, however the need to switch between the different types of input is not much better than switching between different keyboards. This may be alleviated through the passive switching mechanisms described in Chinese Patent Application Publication No. 102109954 and PCT Pamphlet No. WO 2014/045414 in which a handwriting panel is overlaid on a virtual keyboard. These patent applications describe that discrimination (i.e., switching) of keyboard and handwriting input is made by distinguishing between taps on the keys of the keyboard and handwritten swipes or strokes over the keyboard. Such a mechanism may provide for relatively easy handwriting input for some virtual keyboards, however there is a growing popularity of keyboards which accept stroke-like input as well, such as the Swype®, SwiftKey® and TouchPal® keyboards. Accordingly, the mechanisms of these patents would not be able to distinguish between handwriting and stroked 'keying' for such keyboards.

SUMMARY

The examples of the present invention that are described herein below provide systems and methods for recognizing input of multiple input types on computing devices.

In one example, a system is provided for recognizing input of multiple input types on computing devices. Each computing device may include a processor and at least one non-transitory computer readable medium for recognizing input under control of the processor. The non-transitory computer readable medium may be configured to accept input, with respect to an interface surface of a computing device, of one or more types of a plurality of different types of input, cause recognition of the input as a plurality of recognized objects regardless of the one or more input types, each recognized object being associated with a corresponding probability of recognition, and return at least one of the recognized objects as the recognized input based on the probabilities.

The different types of input may be accepted with respect to at least one portion of the interface surface. The at least one non-transitory computer readable medium may be configured to cause display on the at least one portion of the interface surface a layout of character keys as a keyboard.

The different types of input may include single-position interactions and multi-position interactions with respect to the interface surface. The single-position interactions may correspond to positions of the keys and the multi-position interactions may correspond to strokes through positions of a plurality of the keys.

A first recognized object of the plurality of recognized objects may correspond to recognition of the input as one or more single-position interactions regarding one or more of the keys and a second recognized object of the plurality of recognized objects may correspond to recognition of the input as one or more single-position interactions disregarding the keys.

A third recognized object of the plurality of recognized objects may correspond to recognition of the input as one or more multi-position interactions regarding one or more of the keys and a fourth recognized object of the plurality of recognized objects may correspond to recognition of the input as one or more multi-position interactions disregarding the keys.

In another example, a method is provided for recognizing input of multiple input types on computing devices. Each computing device may include a processor and at least one non-transitory computer readable medium for recognizing input under control of the processor. The method may include the steps of accepting input, with respect to an interface surface of a computing device, of one or more types of a plurality of different types of input, causing recognition of the input as a plurality of recognized objects regardless of the one or more input types, each recognized object being associated with a corresponding probability of recognition, and returning at least one of the recognized objects as the recognized input based on the probabilities.

The different types of input may be accepted by the method with respect to at least one portion of the interface surface. The method may include the step of causing display on the at least one portion of the interface surface a layout of character keys as a keyboard.

The different types of input may include single-position interactions and multi-position interactions with respect to the interface surface. The single-position interactions may correspond to positions of the keys and the multi-position interactions may correspond to strokes through positions of a plurality of the keys.

A first recognized object of the plurality of recognized objects may correspond to recognition of the input as one or more single-position interactions regarding one or more of the keys and a second recognized object of the plurality of recognized objects may correspond to recognition of the input as one or more single-position interactions disregarding the keys.

A third recognized object of the plurality of recognized objects may correspond to recognition of the input as one or more multi-position interactions regarding one or more of the keys and a fourth recognized object of the plurality of recognized objects may correspond to recognition of the input as one or more multi-position interactions disregarding the keys.

In another example, a non-transitory computer readable medium is provided having a computer readable program code embodied therein. The computer readable program code may be adapted to be executed to implement a method for recognizing input of multiple input types on a computing device. The computing device may include a processor and at least one system non-transitory computer readable medium for recognizing the input under control of the processor. The method may include the steps of accepting input, with respect to an interface surface of a computing device, of one or more types of a plurality of different types of input, causing recognition of the input as a plurality of recognized objects regardless of the one or more input types, each recognized object being associated with a corresponding probability of recognition, and returning at least one of the recognized objects as the recognized input based on the probabilities.

The different types of input may be accepted by the implemented method with respect to at least one portion of the interface surface. The implemented method may include the step of causing display on the at least one portion of the interface surface a layout of character keys as a keyboard.

The different types of input may include single-position interactions and multi-position interactions with respect to the interface surface. The single-position interactions may correspond to positions of the keys and the multi-position interactions may correspond to strokes through positions of a plurality of the keys.

A first recognized object of the plurality of recognized objects may correspond to recognition of the input as one or more single-position interactions regarding one or more of the keys and a second recognized object of the plurality of recognized objects may correspond to recognition of the input as one or more single-position interactions disregarding the keys.

A third recognized object of the plurality of recognized objects may correspond to recognition of the input as one or more multi-position interactions regarding one or more of the keys and a fourth recognized object of the plurality of recognized objects may correspond to recognition of the input as one or more multi-position interactions disregarding the keys.

BRIEF DESCRIPTION OF THE DRAWINGS

The present system and method will be more fully understood from the following detailed description of the examples thereof, taken together with the drawings. In the drawings like reference numerals depict like elements. In the drawings.

DETAILED DESCRIPTION

Figure 1:
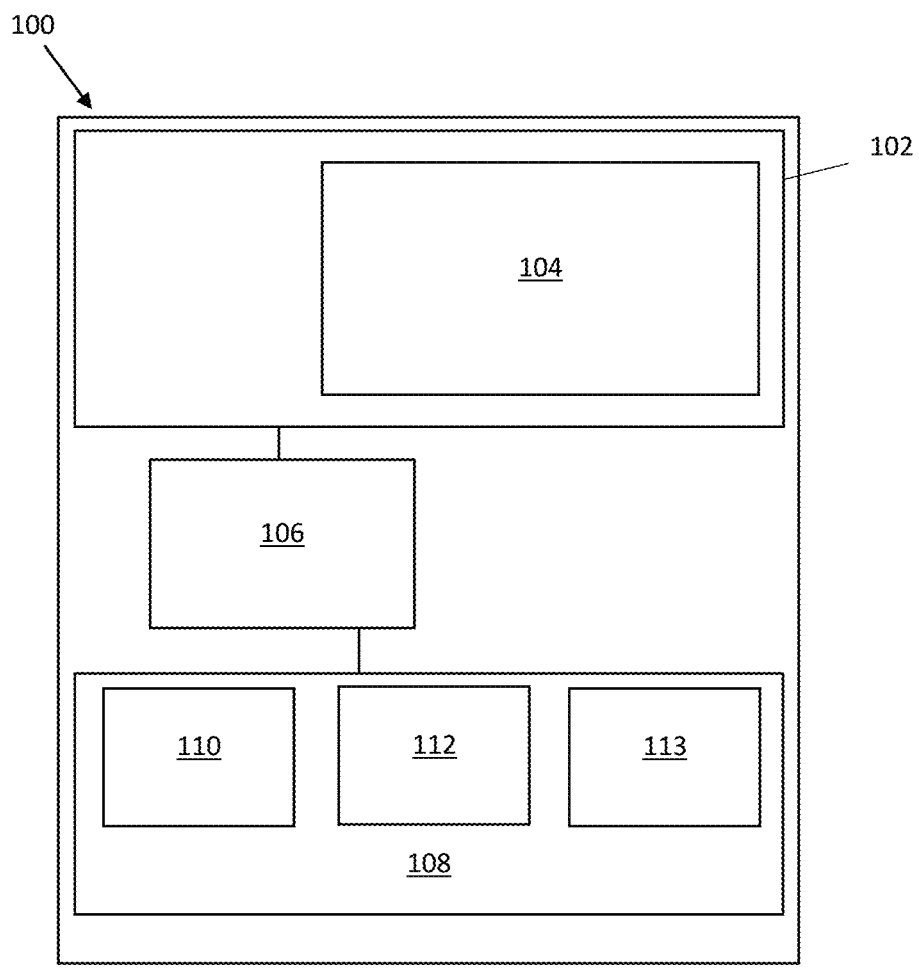
FIG. 1 shows a block diagram of a computing device in accordance with an example of the present system and method.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Reference to and discussion of directional features such as up, down, above, below, lowest, highest, horizontal, vertical, etc., are made with respect to the Cartesian coordinate system as applied to the input surface on which the input to be recognized is made. Further, terms such as left and right are made in relation to the reader's frame of reference when viewing the drawings. Furthermore, the use of the term 'text' in the present description is understood as encompassing all alphanumeric characters, and strings thereof, in any written language and common place non-alphanumeric characters, e.g., symbols, used in written text. Further still, the term 'non-text' in the present description is understood as encompassing freeform handwritten or hand-drawn content and rendered text and image data, as well as non-alphanumeric characters, and strings thereof, and alphanumeric characters, and strings thereof, which are used in non-text contexts. Furthermore, the examples shown in these drawings are in a left-to-right written language context, and therefore any reference to positions can be adapted for written languages having different directional formats.

The various technologies described herein generally relate to capture, processing and management of hand-drawn and handwritten content on portable and non-portable computing devices in a manner which retains the inputted style of the content while allowing conversion to a faithful typeset or beautified version of that content. The systems and methods described herein may utilize recognition of users' natural writing and drawing styles input to a computing device via an input surface, such as a touch sensitive screen, connected to, or of, the computing device or via an input device, such as a digital pen or mouse, connected to the computing device or via a physical or virtual surface monitored by a position detection system. Whilst the various examples are described with respect to recognition of handwriting input using so-called online recognition techniques, it is understood that application is possible to other forms of input for recognition, such as offline recognition in which images rather than digital ink are recognized. The terms hand-drawing and handwriting are used interchangeably herein to define the creation of digital content by users through use of their hands either directly onto a digital or digitally connected medium or via an input tool, such as a hand-held stylus. The term "hand" is used herein to provide concise description of the input techniques, however the use of other parts of a users' body for similar input is included in this definition, such as foot, mouth and eye.

FIG. 1 shows a block diagram of an example computing device 100. The computing device may be a computer desktop, laptop computer, tablet computer, e-book reader, mobile phone, smartphone, wearable computer, digital watch, interactive whiteboard, global positioning system (GPS) unit, enterprise digital assistant (EDA), personal digital assistant (PDA), game console, or the like. The computing device 100 includes components of at least one processing element, some form of memory and input and/or output (I/O) devices. The components communicate with each other through inputs and outputs, such as connectors, lines, buses, cables, buffers, electromagnetic links, networks, modems, transducers, IR ports, antennas, or others known to those of ordinary skill in the art.

In the example shown, the computing device 100 has at least one display 102 for outputting data from the computing device such as images, text, and video. The display 102 may use LCD, plasma, LED, iOLED, CRT, or any other appropriate technology that is or is not touch sensitive as known to those of ordinary skill in the art. At least some of the display 102 is co-located with at least one input surface 104. The input surface 104 may employ technology such as resistive, surface acoustic wave, capacitive, infrared grid, infrared acrylic projection, optical imaging, dispersive signal technology, acoustic pulse recognition, or any other appropriate technology as known to those of ordinary skill in the art to receive user input. The input surface 104 may be bounded by a permanent or video-generated border that clearly identifies its boundaries. Alternatively, the computing device may include the input surface independent of, or without, a display. In the case of a device having no display, input made via the input surface is not displayed by the computing device, rather the device acts as an input device only with the recognized input (discussed later) used for control input, for example, or displayed as content on a connected device or dedicated display device.

In addition to the input surface 104, the computing device 100 may include one or more additional I/O devices (or peripherals) that are communicatively coupled via a local interface. The additional I/O devices may include input devices such as a keyboard, mouse, scanner, microphone, touchpads, bar code readers, laser readers, radio-frequency device readers, or any other appropriate technology known to those of ordinary skill in the art. Further, the I/O devices may include output devices such as a printer, bar code printers, or any other appropriate technology known to those of ordinary skill in the art. Furthermore, the I/O devices may include communications devices that communicate both inputs and outputs such as a modulator/demodulator (modem; for accessing another device, system, or network), a radio frequency (RF) or other transceiver, a telephonic interface, a bridge, a router, or any other appropriate technology known to those of ordinary skill in the art. The local interface may have additional elements to enable communications, such as controllers, buffers (caches), drivers, repeaters, and receivers, which are omitted for simplicity but known to those of skill in the art. Further, the local interface may include address, control, and/or data connections to enable appropriate communications among the other computer components.

The computing device 100 also includes a processor 106, which is a hardware device for executing software, particularly software stored in the memory 108. The processor can be any custom made or commercially available general purpose processor, a central processing unit (CPU), commercially available microprocessors including a semiconductor based microprocessor (in the form of a microchip or chipset), microcontroller, digital signal processor (DSP), application specific integrated circuit (ASIC), field programmable gate array (FPGA) or other programmable logic device, discrete gate or transistor logic, discrete hardware components, state machine, or any combination thereof designed for executing software instructions known to those of ordinary skill in the art.

The memory 108 can include any one or a combination of volatile memory elements (e.g., random access memory (RAM, such as DRAM, SRAM, or SDRAM)) and nonvolatile memory elements (e.g., ROM, EPROM, flash PROM, EEPROM, hard drive, magnetic or optical tape, memory registers, CD-ROM, WORM, DVD, redundant array of inexpensive disks (RAID), another direct access storage device (DASD), or any other magnetic, resistive or phase-change nonvolatile memory). Moreover, the memory 108 may incorporate electronic, magnetic, optical, and/or other types of storage media. The memory 108 can have a distributed architecture where various components are situated remote from one another but can also be accessed by the processor 106. Further, the memory 108 may be remote from the device, such as at a server or cloud-based system, which is remotely accessible by the computing device 100. The memory 108 is coupled to the processor 106, so the processor 106 can read information from and write information to the memory 108. In the alternative, the memory 108 may be integral to the processor 106. In another example, the processor 106 and the memory 108 may both reside in a single ASIC or other integrated circuit.

The software in the memory 108 includes an operating system 110 and an input management system 112. The software optionally further includes an input recognition system 113 which may each include one or more separate computer programs. Each of these has an ordered listing of executable instructions for implementing logical functions. The operating system 110 controls the execution of the input management system 112 (and the input recognition system 113), or may incorporate the functions of the input management system 112 (and the input recognition system 113). The operating system 110 may be any proprietary operating system or a commercially or freely available operating system, such as WEBOS, WINDOWS®, MAC and IPHONE OS®, LINUX, and ANDROID. It is understood that other operating systems may also be utilized.

The input management system 112 includes one or more processing elements related to detection, management and treatment of user input (discussed in detail later). The software may also include one or more applications related to input recognition, different functions, or both. Some examples of other applications include a text editor, telephone dialer, contacts directory, instant messaging facility, computer-aided design (CAD) program, email program, word processing program, web browser, and camera. The input management system 112, and the applications, include program(s) provided with the computing device 100 upon manufacture and may further include programs uploaded or downloaded into the computing device 100 after manufacture.

Figure 2:
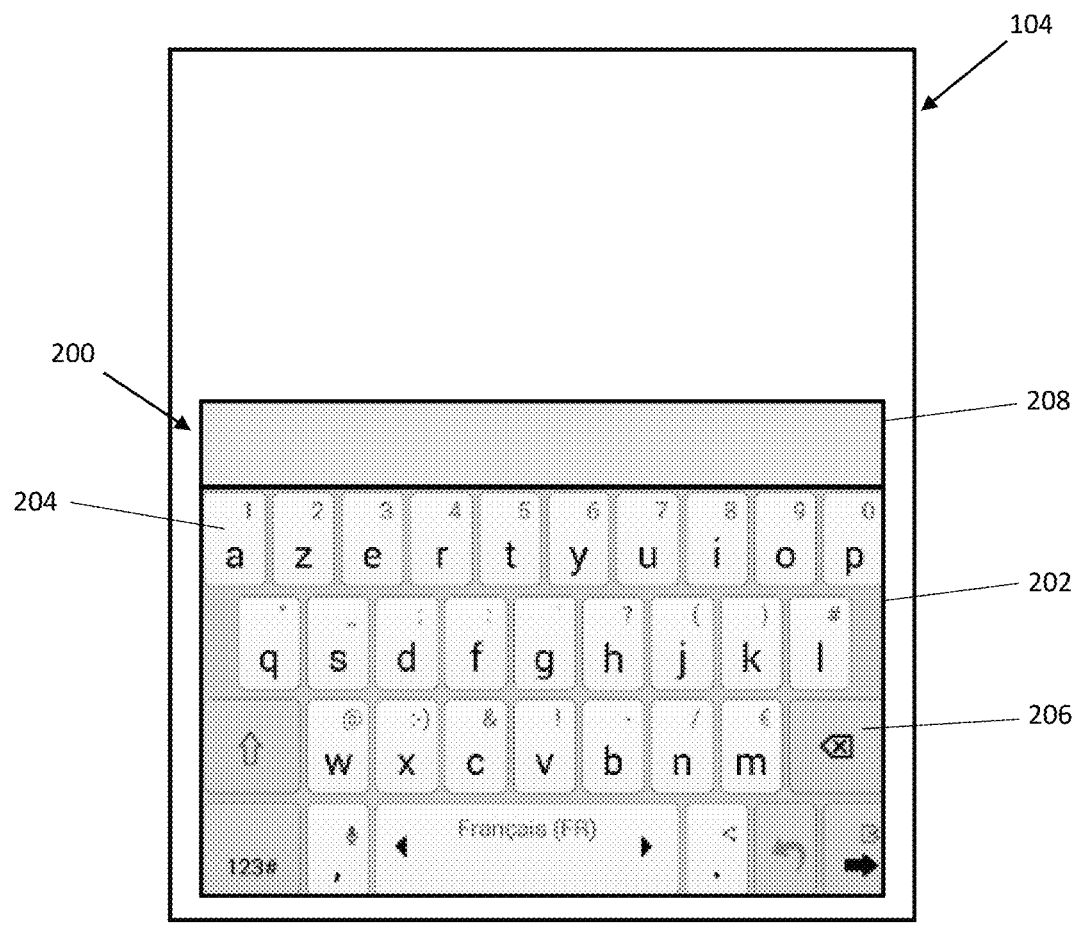
FIG. 2 shows a schematic view of an example visual rendering of an input area provided by an input management system on a portion of an input surface of the computing device in accordance with an example of the present system and method.

The input management system 112 of the present system and method manages input into the computing device 100 via the interface surface 104, for example. Input is managed through the provision of input tools to users and the handling of the input for processing and the like. The input tools include the provision and display of dedicated input areas on the interface surface 104 or the provision of the (substantially) entire interface surface 104 for the receipt of user input via interaction with the touch sensitive interface surface 104. The dimensions and functionality of these input areas are provided in correspondence with, and responsive to, the dimensions and orientation of the display area of the device display 102 in a manner well understood by those skilled in the art. FIG. 2 shows an example input area 200 displayed by the input management system 112 on the interface surface 104. The input area 200 is an area or zone of the display of the computing device 100 which is to be used for the input of content and/or control gestures by users. Any digital device user is already accustomed to gesturing on screen to type or write content and to enter control commands for application and device navigation, content editing, etc. Such interactions with the interface surface 104 of the computing device 100 are generally detected by the processor 106 and this information is communicated to the input management system 112 for interpretation and recognition processing.

The input area 200 includes an input panel 202 for receiving user input through single-point or single-position gestures or interactions, such as tap, short or long press, multi-point or multi-position gestures or interactions, such as double tap, and stroke gestures, such as swipe. In order to translate these gestures to input of specific content or commands, the input panel 202 may display a keyboard layout such as the 'azerty' style keyboard layout variant of the 'qwerty' keyboard layout shown in FIG. 2. This keyboard layout is merely an example, and many other known keyboard layouts and methods, e.g., qwerty or azerty mapped layouts for language specific variants like BoPoMoFo, Hangul, JIS, phonetic, non-qwerty layouts for different languages like Hanyu Pinyin, Jcuken, InScript, or yet-to-be-developed keyboard layouts, are applicable to the present system and method used either singularly with respect to the computing device or selectively (discussed in detail later) by storage of different keyboard layouts in the memory 108, for example. Further, layouts that provide access to non-alphabetic characters, such as numerals, grammatical marks, emojis, etc. are also applicable, typically selectively (discussed in detail later).

As discussed, the example input panel 202 of FIG. 2 includes a keyboard layout. The keyboard layout has content keys 204 which when interacted with by users, such as through a single-point gesture or 'strike' thereon or over, result in the input of content, and command keys 206 which when interacted with by users, such as through a single-point gesture or strike thereon or over, result in the input of control commands, e.g., applying a tap on the "backspace" key causes the backspacing deletion of previously input characters, or launching of keyboard sub- or dedicated layouts, e.g., special character layouts having keys for numerals, grammatical marks, emojis, language specific layouts as described above, language alternatives layouts providing access to accents, character alternatives based on strokes, etc. Both the content and command keys are generally displayed with character depictions corresponding to the content or command input which results from interaction with that key.

The input panel 202 may be displayed upon the receipt of certain user actions, such as the launching of an application on the computing device 100, or interaction with components of that application such as a menu, for example, for the input of content. However, the present system and method is not restricted to such a mechanism, and the input panel 202 may be provided for the receipt of user input whenever and at any time the interface surface 104 is active, e.g., able to accept user interaction. This is particularly the case where the input panel corresponds substantially to the entire interface surface, such that user interaction with the interface surface represents interaction with the input panel. This aspect of the present system and method is discussed in more detail later.

Figure 3:
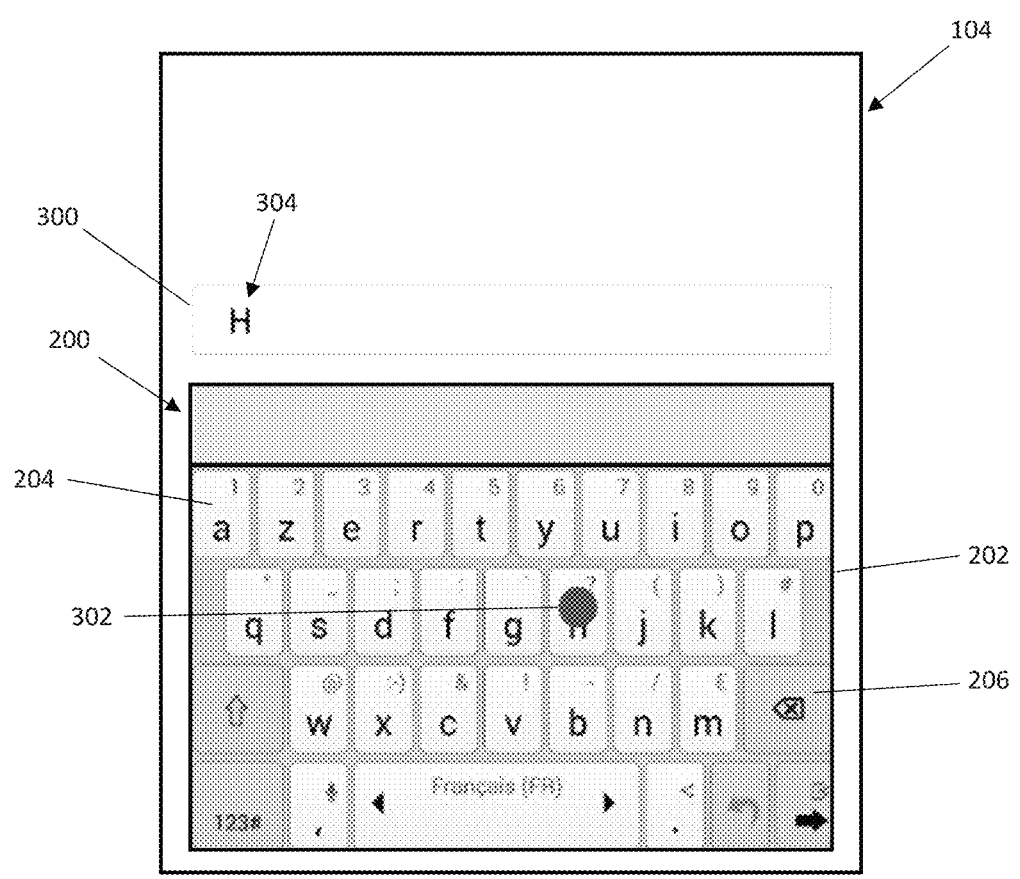
FIG. 3 shows the input area with a depiction of example received input of a first type and consequential display of recognized content in a content display area provided by the input management system on another portion of the input surface in accordance with an example of the present system and method.

In the example depicted in the present drawings, input of content via the input panel 202 may cause the rendered display of the content elsewhere on the display 102, such as a content display area or zone 300 shown in FIG. 3. The display area 300 may be a component of an active application of the computing device 100, for example. It is understood that the display area is merely an example, and other forms and configurations of a display zone, or use of the entire display of the device, are also applicable. In the example of FIG. 3, an interaction 302, such as a tap, on the "h" key 204 of the displayed keyboard causes the letter "h" to be input as content. As a result, the input management system 112 causes display of corresponding content 304 in the display area 300 as a recognized object, shown as the input character "h" capitalized to "H", as per content rules applied by the input management system 112 and/or the active application, for example. In the drawings interactions, such as the interaction 302, are illustrated with a solid circular form roughly indicating the extent of the interaction with the interface surface 104 of the digital device 100. This illustration is merely for the purposes of example and may or may not be actually displayed during (and after) the interactions.

In the present system and method the input management system 112 causes display of the input content either directly or via communication of the input to the active application and/or operating system 110, for example, in a manner similar to that conventionally employed by operating systems and components and applications thereof. That is, the content input to the computing device 100 by typing using keyboard is interpreted by a keyboard or typing decoder (discussed in detail later) using logic, such a fuzzy logic for example, and each element of the content, e.g., characters, symbols, grammatical marks, emojis, words containing the characters, sentences containing the words and the symbols, etc., paragraphs containing the sentences, is encoded in the digital content. This digital content is handled by the computing device 100 in a well understood manner, with each digital character treated as a digital object. In this way, functions such as input or editing cursor placement for interaction with the digital content can be made in relation to each digital object.

Figure 4:
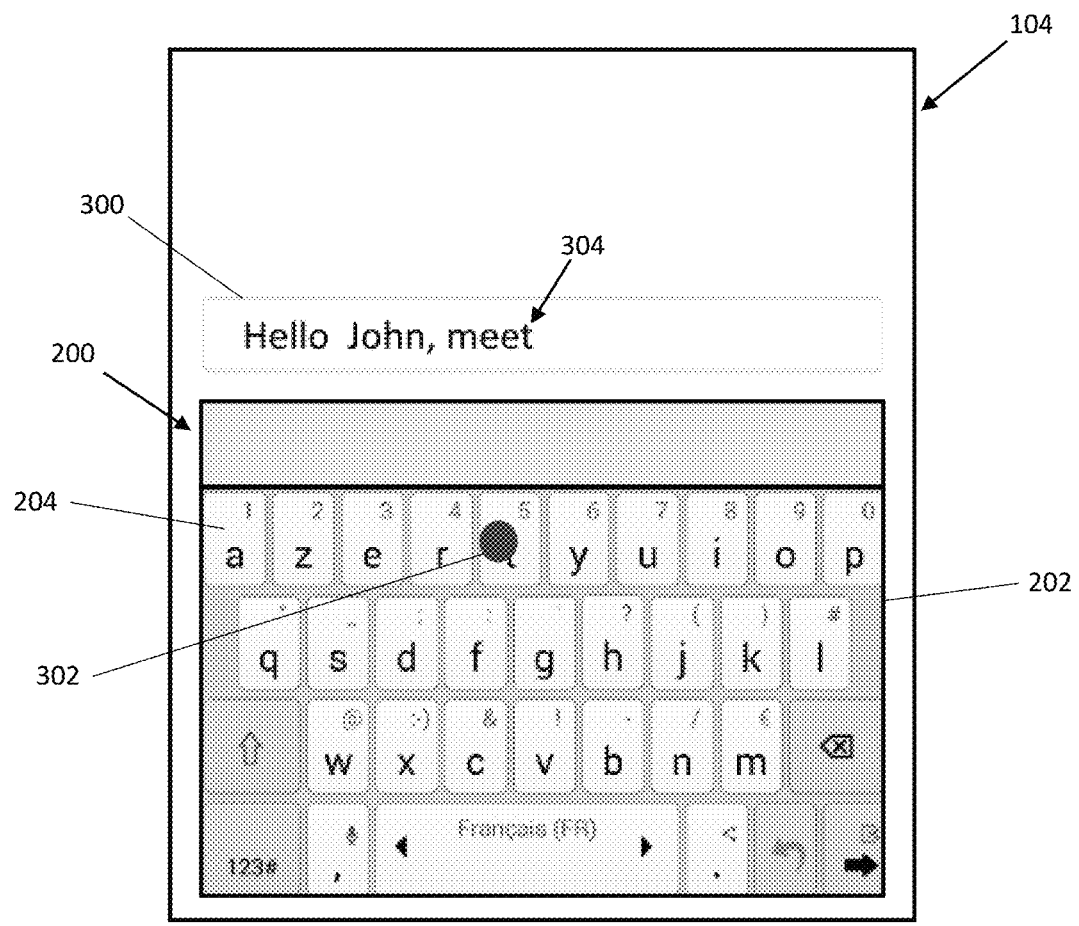
FIG. 4 shows the input area with a depiction of further example received first type input and consequential display of recognized content in the content area.

FIG. 4 shows the result of continued input via 'touch' typing on the keyboard of the input panel 202. That is, the keys 204 have been further individually 'tapped' to add to the content 304 displayed in the display area such that, with the final key interaction 302 shown, the displayed content 304 is updated as including one or more recognized objects, e.g., corresponding to the words and comma "Hello John, meet". As content beyond what can be displayed in the display area 300 is input, the recognized content displayed therein may be scrolled from view in the display area, for example, in a manner governed by the content application, for example.

Figure 5:
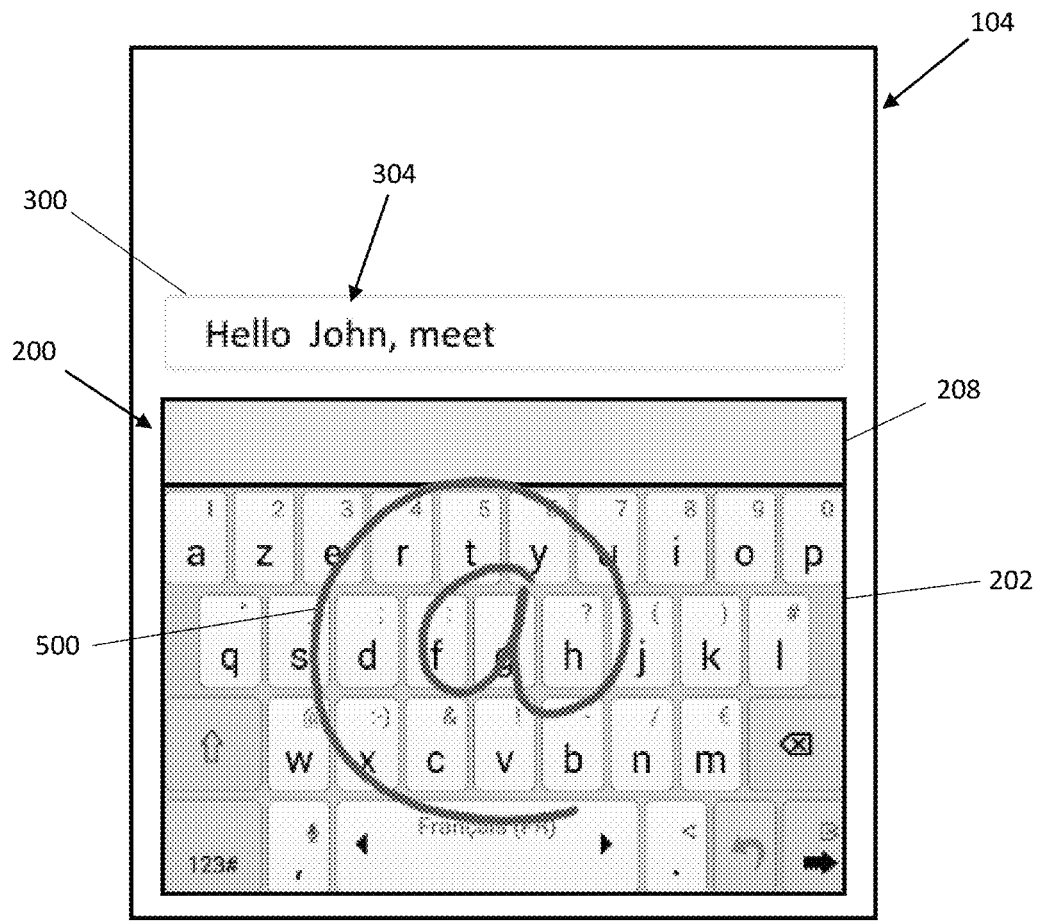
FIG. 5 shows the input area with a depiction of example received input of a second type.

FIG. 5 shows the result of continued input 500 using the input panel 202, but rather than the input being via 'touch' typing through interaction with the individual keys 204 of the keyboard layout, the further input 500 is entered by handwriting on or over the input panel 202. As can be seen, the handwriting input 500 is input as a single stroke over the displayed keyboard layout to form the character or symbol "@" corresponding to 'at', which is commonly used for email addressing. A user may enter such a stroke with a finger or some instrument such as a pen or stylus suitable for use with the input surface 104. The user may also enter a stroke by making a gesture above the input surface 104 if technology that senses motions in the vicinity of the input surface 104 is being used, or with a peripheral device of the computing device 100, such as a mouse or joystick. A stroke is characterized by at least the stroke initiation location, the stroke termination location, and the path connecting the stroke initiation and termination locations as captured by the input management system 112 and/or input recognition system 113. Further information such as timing, pressure, angle at a number of sample points along the path may also be captured to provide deeper detail of the strokes.

The input management system 112 is configured to detect the input of handwriting on the input panel 202 and cause the handwriting to be recognized by the input recognition system 113 under control of the processor 106, for example. The input recognition system 113 and any of its components, with support and compliance capabilities, may be a source program, executable program (object code), script, application, or any other entity having a set of instructions to be performed. When a source program, the program needs to be translated via a compiler, assembler, interpreter, or the like, which may or may not be included within the memory 108, so as to operate properly in connection with the operating system 110. Furthermore, the input recognition system with support and compliance capabilities can be written as (a) an object oriented programming language, which has classes of data and methods; (b) a procedure programming language, which has routines, subroutines, and/or functions, for example but not limited to C, C++, Pascal, Basic, Fortran, Cobol, Perl, Java, Objective C, Swift, Python, C# and Ada; or (c) functional programming languages for example but no limited to Hope, Rex, Common Lisp, Scheme, Clojure, Racket, Erlang, OCaml, Haskell, Prolog, and F#. Alternatively, the input recognition system 113 may be a method or system for communication with an input recognition system remote from the device, such as server or cloud-based system, but is remotely accessible by the computing device 100 through communications links using the afore-mentioned communications I/O devices of the computing device 100. Further, the input management system 112 and the input recognition system 113 may operate together or be combined as a single system.

Figure 6:
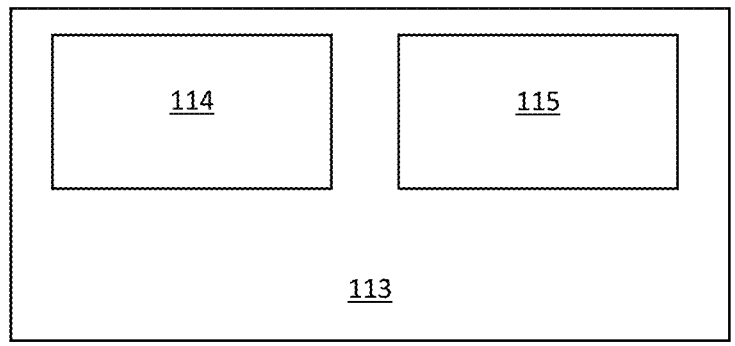
FIG. 6 shows a block diagram of a system for input recognition in accordance with an example of the present system and method.
Figure 7:
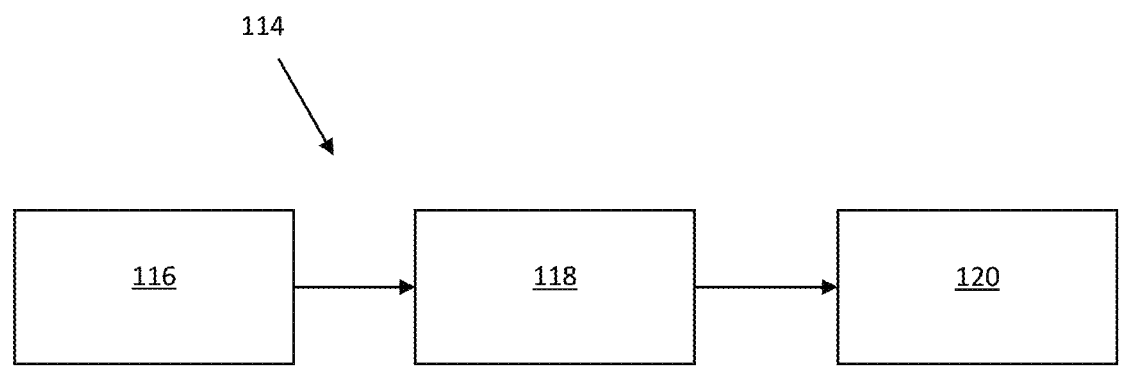
FIG. 7 shows a block diagram of a system for handwriting input recognition in accordance with an example of the present system and method.

FIG. 6 is a schematic pictorial of an example of the input recognition system 113, in either its local (i.e., loaded on the device 100) or remote (i.e., remotely accessible by the device 100) forms. The input recognition system 113 includes a handwriting recognition (HWR) system 114 as a first component and a keyboard recognition (KBR) system 115 as a second component. FIG. 7 is a schematic pictorial of an example of the HWR system 114. The HWR system 114 includes stages such as preprocessing 116, recognition 118 and output 120. The preprocessing stage 116 processes the digital ink to achieve greater accuracy and reducing processing time during the recognition stage 118. This preprocessing may include normalizing of the path connecting the stroke initiation and termination locations by applying size normalization and/or methods such as B-spline approximation to smooth the input. The preprocessed strokes are then passed to the recognition stage 118 which processes the strokes to recognize the objects formed thereby. The recognized objects are then output 120 to the display 102 generally as a typesetted version of the handwritten elements/characters as the afore-described digital objects displayed in the output area 300, for example.

Figure 8:
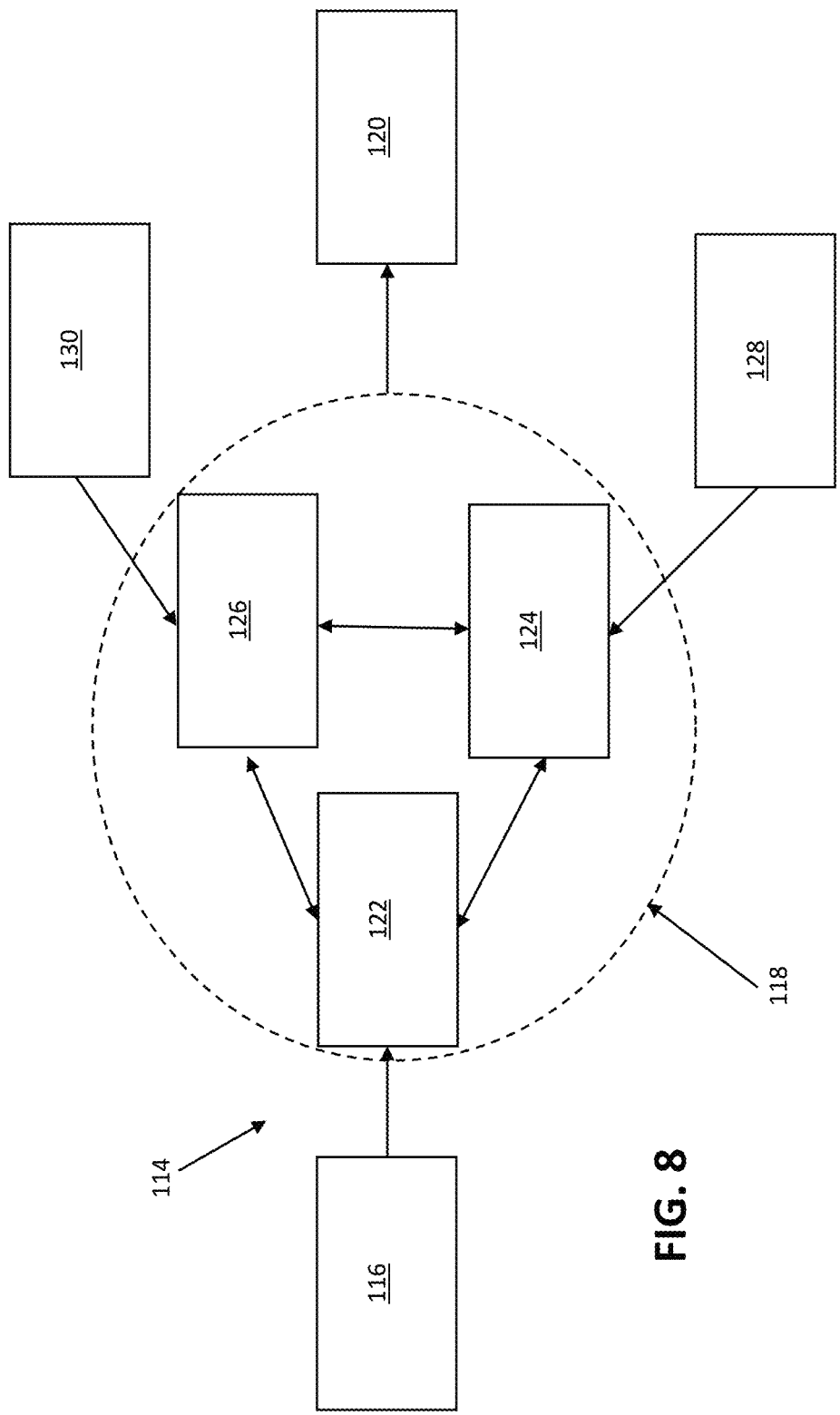
FIG. 8 shows a block diagram illustrating detail of the handwriting input recognition system of FIG. 7 in accordance with an example of the present system and method.

The recognition stage 118 may include different processing elements or experts. FIG. 8 is a schematic pictorial of the example of FIG. 7 showing schematic detail of the recognition stage 118. Three experts, a segmentation expert 122, a recognition expert 124, and a language expert 126, are illustrated which collaborate through dynamic programming to generate the output 120. Because different users may naturally write the same object, e.g., a letter, a shape, a symbol, with slight variations, the HWR system accommodates a variety of ways in which each object may be entered whilst being recognized as the correct or intended object.

The segmentation expert 122 defines the different ways to segment the input strokes into individual element hypotheses, e.g., alphanumeric characters and mathematical operators, text characters, individual shapes, or sub expression, in order to form expressions, e.g., words, mathematical equations, or groups of shapes. For example, the segmentation expert 122 may form the element hypotheses by grouping consecutive strokes of the original input to obtain a segmentation graph where each node corresponds to at least one element hypothesis and where adjacency constraints between elements are handled by the node connections. Alternatively, the segmentation expert 122 may employ separate experts for different input types, such as text, drawings, equations, and music notation.

The recognition expert 124 provides classification of the features extracted by a classifier 128 and outputs a list of element candidates as possible recognition objects with probabilities or recognition scores for each node of the segmentation graph. Many types of classifiers exist that could be used to address this recognition task, e.g., Support Vector Machines, Hidden Markov Models, or Neural Networks such as Multilayer Perceptrons, Deep, Convolutional or Recurrent Neural Networks. The choice depends on the complexity, accuracy, and speed desired for the task.

The language expert 126 generates linguistic meaning for the different paths in the segmentation graph using language models (e.g., grammar or semantics). The expert 126 checks the candidates suggested by the other experts according to linguistic information 130. The linguistic information 130 can include a lexicon, regular expressions, etc. and is the storage for all static data used by the language expert 126 to execute a language model. A language model can rely on statistical information on a given language. The linguistic information 130 is computed off-line, with or without adaptation according to the results of recognition and user interactions, and provided to the linguistic expert 126. The language expert 126 aims at finding the best recognition path. In one example, the language expert 126 does this by exploring a language model such as finite state automaton (FSA) representing the content of linguistic information 130. In addition to the lexicon constraint, the language expert 126 may use a language model with statistical information modeling for how frequent a given sequence of elements appears in the specified language or is used by a specific user to evaluate the linguistic likelihood of the interpretation of a given path of the segmentation graph.

For the handwritten input 500 of FIG. 5, for example, the HWR system 114 outputs the recognition result of "@" as a recognized object. Accordingly, the input management system 112 causes the content input 304 to be updated with the newly entered character such that the displayed content 304 is updated and corresponds to the recognized object(s)

Figure 9:
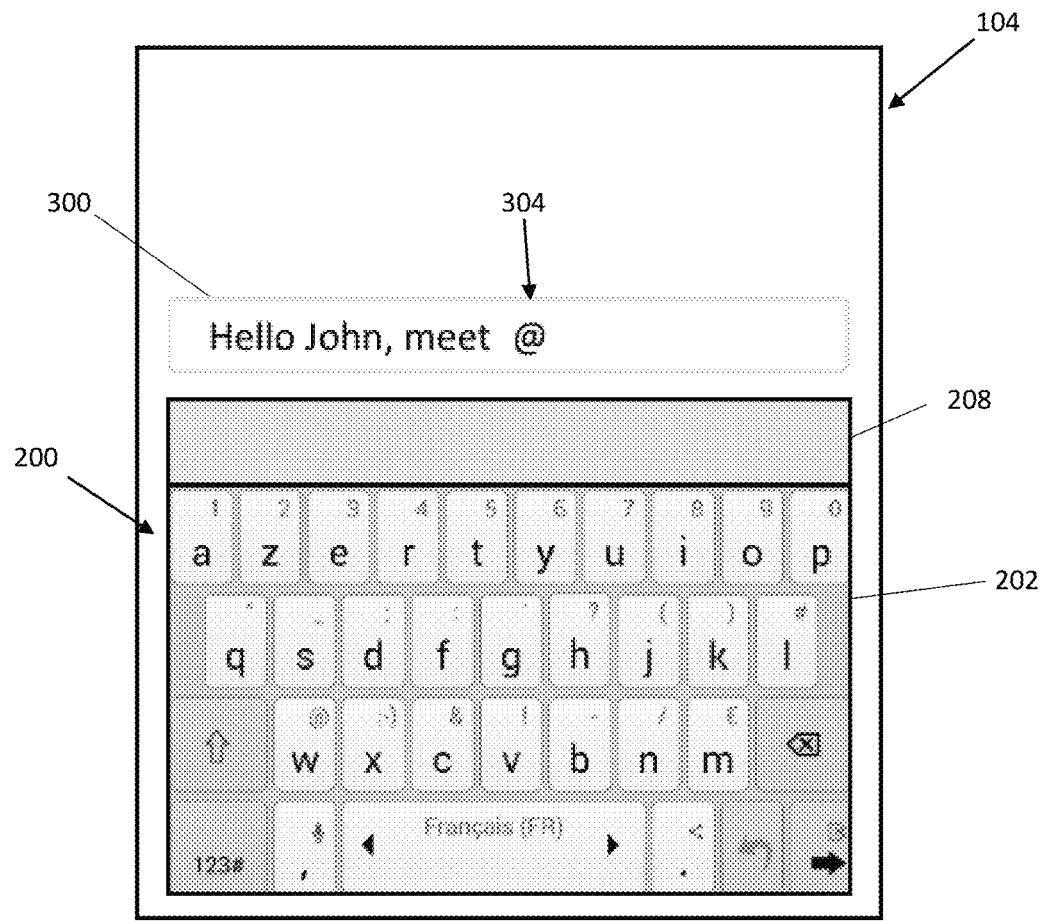
FIG. 9 shows the consequential display of content in the content area recognized from the received second type input of FIG. 5.

"Hello John, meet @" as shown in FIG. 9. In FIG. 9 the display of the digital ink corresponding to the handwritten input 500 is ceased upon return and display of the recognition result. The timing and manner of the removal of the digital ink display may be provided in a number of ways. For example, the digital ink may be displayed for a certain length of time (e.g., about 0.2 seconds to about 0.5 seconds) then removed as the recognition result is displayed as a digital object or typeset ink, or display of the recognition result is made more quickly (e.g., as soon as the result is returned by the input recognition system 113) and the digital ink remains displayed for a certain length of time thereafter (e.g., about 0.2 seconds to about 0.5 seconds) then removed, or the digital ink display is removed as soon as new typing input is received, or removed as soon as new handwriting input is received and/or displayed as new digital ink, or after a certain time has elapsed e.g., about 0.2 seconds to about 0.5 seconds) after receipt of subsequent handwritten input in an example of the present system and method in which superimposed handwritten input is accepted, for example, as described in United States Patent Publication Nos. 2015/0286886 and 2015/0356360 filed in the name of the present Applicant and Assignee, the entire contents of which is incorporated by reference herein. Further, the removal of display of the digital ink may be made in a gradual manner with fading of the digital ink rendering, for example.

As such, the present system and method provides input management which allows users to input content, such as words, parts of words, letters, symbols, figures, special characters, to a digital device using multiple input modes. As described above, this multi-modal input system and method causes display of an input panel on the interactive surface of the digital device which has a primary input tool, e.g., a virtual or digital keyboard, and a secondary input tool, e.g., a handwriting pad. As such, it is possible for users to input content using the keys of the keyboard and also using handwriting strokes without any modification or re-display of the input panel or input mode switching either manually, e.g., through user input of gestures or interaction with soft or hard buttons/menus, or automatically, e.g., through detection of handwriting versus 'keying' of the keyboard.

The KBR system 115 represents the afore-mentioned keyboard or typing decoder which interprets the single-point gestures or 'keystrokes' on the keyboard layout. That is, the KBR system 115 determines the keyboard layout, from the plurality of possible keyboard layouts that could be displayed as stored in the memory 108 of the digital device 100, for example, which is being interacted with in the input panel 202 and therefore the relative positions of any keystrokes in the input panel 202 are mapped to the keys 204 and 206 of the present keyboard layout. From this mapping, the KBR system 115 determines the character(s) or functions corresponding to the interacted keys 204 and 206 and outputs the determined character(s) for rendering as the objects within the output area 300 and enacts commands, such as keyboard layout change, menu launching and editing operations on the recognized content in the display area 300, for example. Keyboard layout change may also be provided by interaction with the input panel 202 such as input of a multiple-point gesture, like swiping, in order to 'reveal' display of different keyboard layouts.

The KBR system 115 may use 'one-to-one' or non-fuzzy logic to interpret the keystrokes such that a key having the greatest gesture surface area of interaction is determined as the key intended by the user for input. That is, since a virtual keyboard does not have physical 'keys' and the size of the device display 102 may limit the size of the keys within the keyboard layout and the spacing therebetween, it is possible that users will strike more than one key substantially simultaneously. Such multiple keystrokes make interpretation of the intended key 'press' uncertain. Using non-fuzzy logic rules, such as the above superior area rule, provide one way of dealing with this uncertainty. The KBR system 115 may alternatively utilize fuzzy logic in order to handle such multiple keystrokes. With such fuzzy keyboard logic, the KBR system 115 provides key candidates as possible recognition objects based on which keys have been interacted with, including multiple interactions with single keys on reduced size keyboard layouts having limited keys displayed, e.g., multiple taps in order to access alternates to the displayed character keys, such as accents, upper/lower case, language changes, symbols, numbers, etc., and assigns probability scores for the keys based on parameters, like the relative areas of key interaction or other well-known prediction methods. Alternatively, the KBR system 115 may employ probability processing similar to the HWR system 114 (described in more detail later).

The use of both the handwriting and keyboard recognition systems by the input management system enables multi-modal or multi-type input to be realized in its simplest form without need for explicit mode switching. That is, when the input management system 112 detects input of single-point gestures, such as taps, on the input panel the corresponding positional (and temporal) information is routed to the KBR system 115 by the input recognition system 113 for interpretation and when the input management system 112 detects input of multi-point gestures, such as strokes, on the input panel the corresponding positional (and temporal) information is routed to the HWR system 114 by the input recognition system 113 for interpretation. This relatively simple mechanism for routing each input element for recognition processing by the appropriate recognizer may not provide accurate recognition for all inputs however.

This is because, there are elements of handwriting that do not use, or only use, 'long' strokes, e.g., strokes which transcribe a path, like the input 500 of FIG. 5, but use relatively 'short' strokes, e.g., strokes which do not transcribe a path. For example, a period "." could be handwritten on the input panel 202 on one of the keys 204 of the keyboard layout which does not correspond to a period such that the recognition result would be the interpretation of the key of the keyboard from the KBR system not the handwritten period character from the HWR system. Further, a colon ":", a semi-colon ";", an exclamation mark "!", a question mark "?", or the alphabetic characters "i" and "j", which each partly contain a dot ".", could be handwritten on the input panel 202 such that the recognition result would be the interpretation by the KBR system of the key of the keyboard layout on which the dot is handwritten and the interpretation by the HWR system of the other parts of these handwritten characters. In either case, the recognition result is clearly inaccurate as it does not properly recognize the intended input. Having said this, the intended input may well be a combination of handwritten stroke and keyed input, such that the recognition result is correct. Accordingly, in a further example of the input management system 112 of the present system and method, all input is provided to both the handwriting and keyboard input recognition systems with accurate recognition provided as now described.

Figure 10:
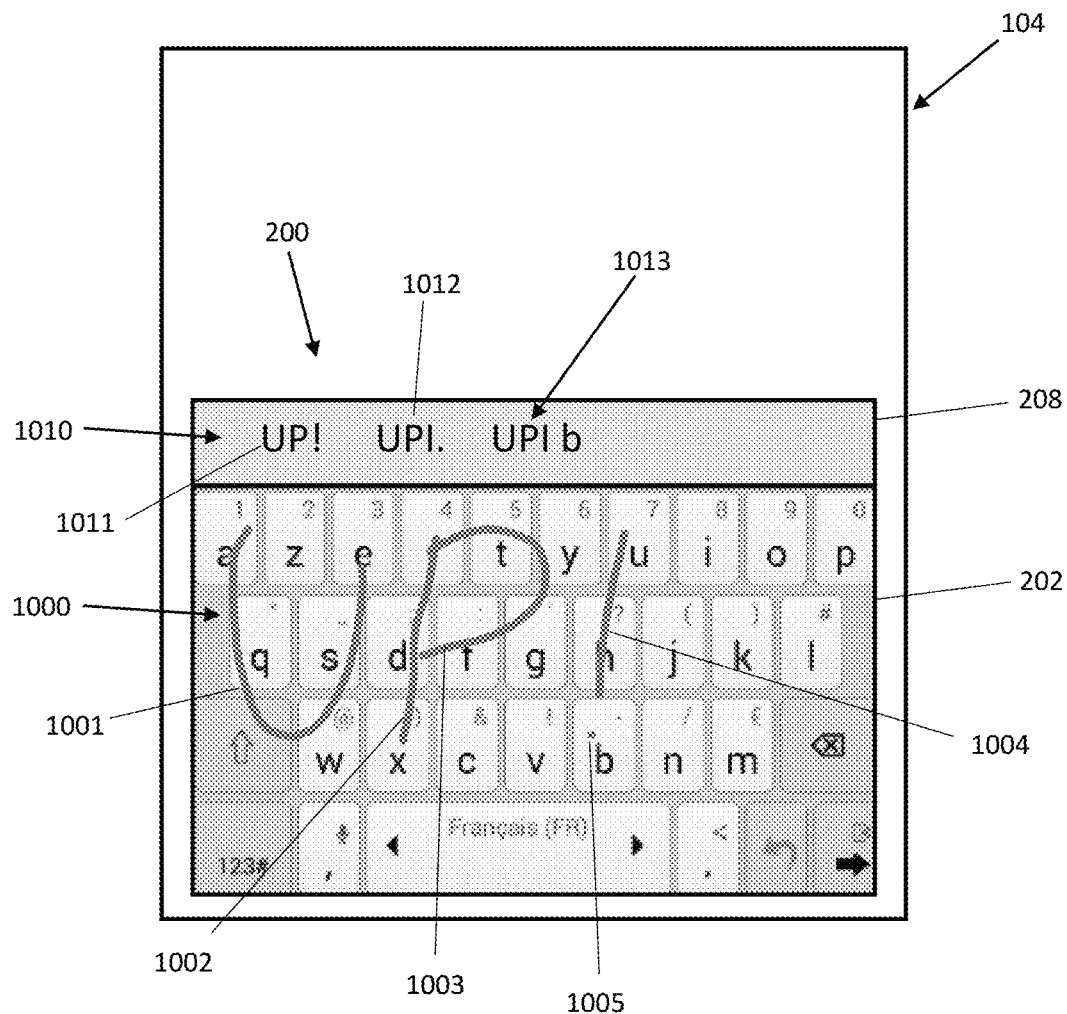
FIG. 10 shows the input area with a depiction of example received second type input and consequential display of recognition candidates in a candidate display area on another portion of the input surface in accordance with an example of the present system and method.

FIG. 10 shows the input panel 202 displaying the keyboard layout of FIG. 2 with example input 1000 rendered as digital ink thereon. The example input 1000 includes handwritten strokes 1001 to 1005. As can be seen, the strokes 1001 to 1004 are multi-point gesture or "long" strokes which pass over many of the keys 204 of the keyboard and the stroke 1005 is a single-point gesture or "short" stroke on one of the keys 204 of the keyboard, which together provide the input 1000 as the word "UP" followed by an exclamation mark "!". As discussed above, the short stroke 1005 could be considered as a handwritten stroke or keyed stroke. This apparent uncertainty of the nature of the short stroke 1005 could be handled in a number of ways. In conventional systems, as an explicit mode switch between keyboard and handwritten entry is required, there is no uncertainty as to the input type (e.g., keyed or handwritten), and such a short stroke would be routed to recognition system which is designated by the current recognition mode. In the present system and method however, such mode switching is not used or required.

The present system and method may handle this uncertainty in one example by considering the type of input at least prior to the input in question. For example, when a possible change of input type from handwriting to typing is detected, the input management system 112 creates a stroke hypothesis that the short stroke is handwriting (or typing) and assesses this hypothesis using context for the short stroke based on the prior strokes (the number of prior strokes taken may be time based, e.g., within about 0 to about 0.5 seconds, and/or quantity based, e.g., previous two or three strokes), assigning a probability score. Any subsequent input received (within a certain time period, e.g., about 0.1 second to about 0.5 seconds, and/or stroke count, e.g., one to three strokes) may also be used to re-assess this hypothesis and adjust the score if needed. If the score is above a settable threshold, say, the stroke is considered to be the same type as at least the immediately previous (and subsequent) stroke, otherwise the stroke is considered to be a different type. The ability to correctly assess such hypotheses is dependent on several factors, such as the input received and the threshold set. The present and system may further utilize such implicit detection of input type change to provide other effects, such as (gradual) fading of the display of the keyboard layout upon detection of continued handwriting input, and re-display of the keyboard layout for input upon detection of keyboard input.

The present system and method may handle uncertainty of input type change in another example by utilizing the recognition processes to assess the above-mentioned hypotheses for input strokes having uncertain type, or all strokes regardless of type. As discussed above, the HWR system 114 of the input recognition system 113 provides recognition objects as character and word candidates for the handwritten strokes and determines probabilities for these character candidates and words, sentences, etc., formed thereby. Similarly, the KBR system 115 of the input recognition system 113 provides character and word candidates for the keyed strokes based on fuzzy logic or logic similar to that used by the HWR system 114, for example.

Accordingly, the input recognition system 115 may function as described above, in which strokes of known type, such as the long strokes 1001 to 1004, are routed to the HWR system 114 only, and when a possible change of input type from handwriting to typing is detected, e.g., at the input of the short stroke 1005, or whenever single-point gesture input strokes that correspond with an underlying key 204 of the keyboard are received, for example, the input recognition system 115 routes these input strokes to both the HWR system 114 and the KBR system 115 together with a selection of the prior strokes (the number of prior strokes taken may be time based, e.g., within about 0.1 to about 0.5 seconds, and/or quantity based, e.g., previous two or three strokes) to test the different stroke hypotheses (e.g., that the short stroke 1005 is handwriting and forms a character with one or more of the long strokes 1001 to 1004 or is typing) and assesses these hypotheses based on the probability metrics of the different recognition systems.

The recognition results of the two recognizers 114 and 115 are the lists of character (and word) candidates for the recognized short stroke(s) with their corresponding recognition probability scores. At this point, the input recognition system 113 may return the highest scoring recognition candidate to the input management system 112 for display of the recognition result in the display area 300, for example. Alternatively, or additionally, the input recognition system 113 may return all recognition candidates, or the highest probability scored thereof (based on a certain of number of candidates to return or a probability score threshold), and the input management system 112 causes display of (at least a sub-set of the highest scoring ones of) the recognition candidates as (an ordered) horizontal list of candidates 1010 in a candidate display area 208 of the input area 200, as shown in FIG. 10. For example, in FIG. 10 the candidate list 1010 includes a candidate 1011 being "UP!", a candidate 1012 being "UPI." and a candidate 1013 being "UPI b". As shown, the candidates are rendered as digital objects or typeset ink in the candidate display area 208. The illustrated relative locations and orientations of the input panel 202 and candidate display area 208 of the input area 200 are merely an example, and other combined or separated display locations and orientations are possible.

The first candidate 1011 corresponds to the recognized input candidate having the highest probability score from both recognizers, and in particular, from the HWR system 114 where all of the input strokes 1001 and 1005 are considered as handwriting input with the strokes 1001 to 1003 forming the word "UP" and the strokes 1004 and 1005 together forming the character "!" based on the afore-described recognition processes used by the HWR system 114, for example.

The second candidate 1012 corresponds to the recognized input candidate having the next highest probability score from both recognizers, and in particular, also from the HWR system 114 where all of the input strokes 1001 to 1005 are considered as handwriting input with the strokes 1001 to 1004 together forming the word "UPI" and the stroke 1005 forming a period ".", related to the character of the stroke 1004, based on the afore-described recognition processes used by the HWR system 114, for example.

The third candidate 1013 corresponds to the recognized input candidate having the next highest probability score from both recognizers, and in particular, from both the HWR and KBR systems 114 and 115 where the input strokes 1001 to 1004 are considered as handwriting input as in the second candidate and the input stroke 1005 is considered as typing input of the key 202 corresponding to "b" based on the afore-described recognition processes used by the HWR and KBR systems, for example.

It is noted a 'space' is provided in the (mixed) candidate 1013 between the recognized handwriting and typing parts of the candidate. Such a space 'character' may be provided by the input recognition system 113 in correspondence with a rule for mixed input type recognition as implemented by the input management system 112. Alternatively, or additionally, the input recognition system 113 may be configured to assess hypotheses for such mixed recognition results to determine word or colocation (e.g., grammatical marks) candidates regardless of the input type and using probability metrics similar to the HWR system 114, for example.

Instead of only sending the uncertain strokes, e.g., short strokes based on single-point gesture input, to both the recognizers, all input stokes are routed by the input recognition system 113 to the HWR system 114 and the KBR system 115. This increases the recognition processing burden but may increase recognition accuracy, especially if a user changes the type of input regularly when composing a piece of content or inputting commands during content input, by using the command keys 206 of the keyboard and/or handwriting. In either case, in the above-described example, the candidate list 1000 is provided with a mixture of recognition results from both recognizers ordered by the likelihoods returned by those recognizers and/or by the likelihood provided by the input recognition system for combined recognition results.

Alternatively, the input management system 112 and/or the input recognition system 113 may further be configured to apply context in order to select or rank the recognition results output by the HWR and KBR systems 114 and 115 both individually, like the candidates 1011 and 1012, or in combination like the candidates 1013, similar to afore-described use of previous (and following) strokes. This can be achieved by weighting the recognition results, and therefore their probability scores, based on the recognition of previous (and following) strokes.

For example, in FIG. 10 the candidate 1011 is ranked first in the candidate list as the probability score returned by the HWR system 114 indicates a reasonably high likelihood of recognition and since all the strokes 1001 to 1005 within the recognized content 1011 are handwritten strokes, such that an additional score or weighting is applied thereby increasing the already reasonably high likelihood. Further, the probability scores for the candidates 1012 and 1013 as returned by the recognizers 114 and 115 and as applied by the input recognition system 113 may be similar given that the recognized word "UPI" may be an out-of-lexicon word in the HWR system 114, for example. However, since all the strokes 1001 to 1004 within the recognized content 1012 are handwritten strokes, the weighting applied thereto results in the candidate 1012 being ranked second above the third candidate 1013.

This contextual weighting may also be applied to distinguish between input of content and commands. For example, the probability score returned by the KBR system 115 for uncertain keyed input corresponding to one of the command keys 206 of the keyboard may be weighted differently depending on whether it is preceded or followed by detected handwritten or keyed input so that the likelihood of input of a keyed command is increased with respect to input of typed or handwritten content. Other forms of weighting or ranking the candidates from the recognizers and/or other mechanisms for setting such weightings are also possible.

For example, user preference of, and/or commonly used, input type may be used to weight the recognition results, thereby providing user adaption to improve the ordering of recognition candidates. That is, the input management system may provide users with the ability to set preferences, e.g., via the UI, for their input generally and/or for different content and commands, and/or may track the input types used by the user. For example, user designation can be made that all content is mostly input using typing or handwriting, text is mostly input using typing and grammatical marks are mostly input using handwriting, text is mostly input using stroke-typing and numbers are mostly input using handwriting, etc. On the other hand, tracking users' habits of input is done by the input management system 112 detecting user input preference through which recognition candidates are accepted by users, for example.

Alternatively, or additionally, the types of input made available to users of the present system and method by the input management system is governed by the environment of use. This can be done for example through pre-defined settings of the input management system which causes display or non-display of certain input type interfaces. For example, in an office environment, all types of input are made available to users such that the displayed user interface is similar to that of the accompanying drawings. On the other hand, in a vehicle environment, the input management system or the device hosting the system which is incorporated in a control system of the vehicle, for example, may cause, through the display or non-display of the keyboard on the interface surface, for example, and/or warning messages to the user, one (first) set of input types to be available when the vehicle is stationary, e.g., all of touch typing, stroke-typing and handwriting since users are able to fully concentrate on the interface surface, and a different (second) set of input types to be available when the vehicle is moving, e.g., handwriting only since users are unable to concentrate on the interface surface for typing but can still perform handwriting, particularly superimposed handwriting in which case the input management system 112 is configured such as described in the afore-incorporated by reference United States Patent Publication Nos. 2015/0286886 and 2015/0356360. When certain input types are not available the input management system weights that input type with a weighting of 0 (zero) so that the returned recognition results from the applicable recognizer are not returned as probable candidates. In this way, safe and appropriate multi-modal input is provided depending on the situation of use.

The present system and method in these alternative examples routes selected, or all, input elements for recognition processing by both the handwriting and keyboard recognizers, rather than just the recognizer designated by the type of input detected, e.g., single- or multi-point gesture input. In this way, increased recognition accuracy and provision of mixed recognition candidates, e.g., including recognized handwritten and keyed characters, are achieved. Accordingly, in these examples the present system and method does not (wholly) rely on the differentiation of stroke type, e.g., short versus long, in order to recognize multi-modal or multi-type input, since mode switching is not used and the detected input elements need not be directed to respective input recognizers. As such, the present system and method is also applicable to recognizing further forms of input using the interface surface 104 of the digital device 100, such as stroke-like typing input on the virtual keyboard, in combination with traditional typing input and handwriting input.

The input management system 112 of the present system and method accepts stroke-like or continuous typing input through configuration of the KBR system 115 to recognize the correspondence of 'long' stroke input and the underlying keys 204 and 206 of the keyboard, for example. The processing utilized by the KBR system 115 to achieve this recognition may be similar to known methods. These methods generally involve tracking the path of the stroke over the keys of the keyboard with or without application of fuzzy logic to account for inter-key paths and considering points of inflection in the path spatially and/or temporally, e.g., changes in direction, curvature, slowing down and speeding up, and the track starting and termination points, in relation to the underlying keys. These indicator points of the path are mapped to the underlying keys, and hypotheses of key candidates are tested for probable character, word, symbol, commands, etc.

For example, in FIG. 10 the stroke 1001 passes through the keys 204 corresponding to the characters "a", "q", "w", "s" and "e" and the command key 206 corresponding to 'shift'. In this single stroke 1001, the indictor points include the start (first) point at the key "a", the turning (second) point at the keys "w" and 'shift' and the end (third) point at the key "e". Accordingly, the one or more hypotheses considered by the input recognition system 113 that the single stroke 1001 was intended by the user as stroke-typing includes an hypothesis for "awe" and an hypothesis for "a", followed by 'shift', followed by "E" (e.g., capitalized due to the 'shift' command), for example.

Figure 11:
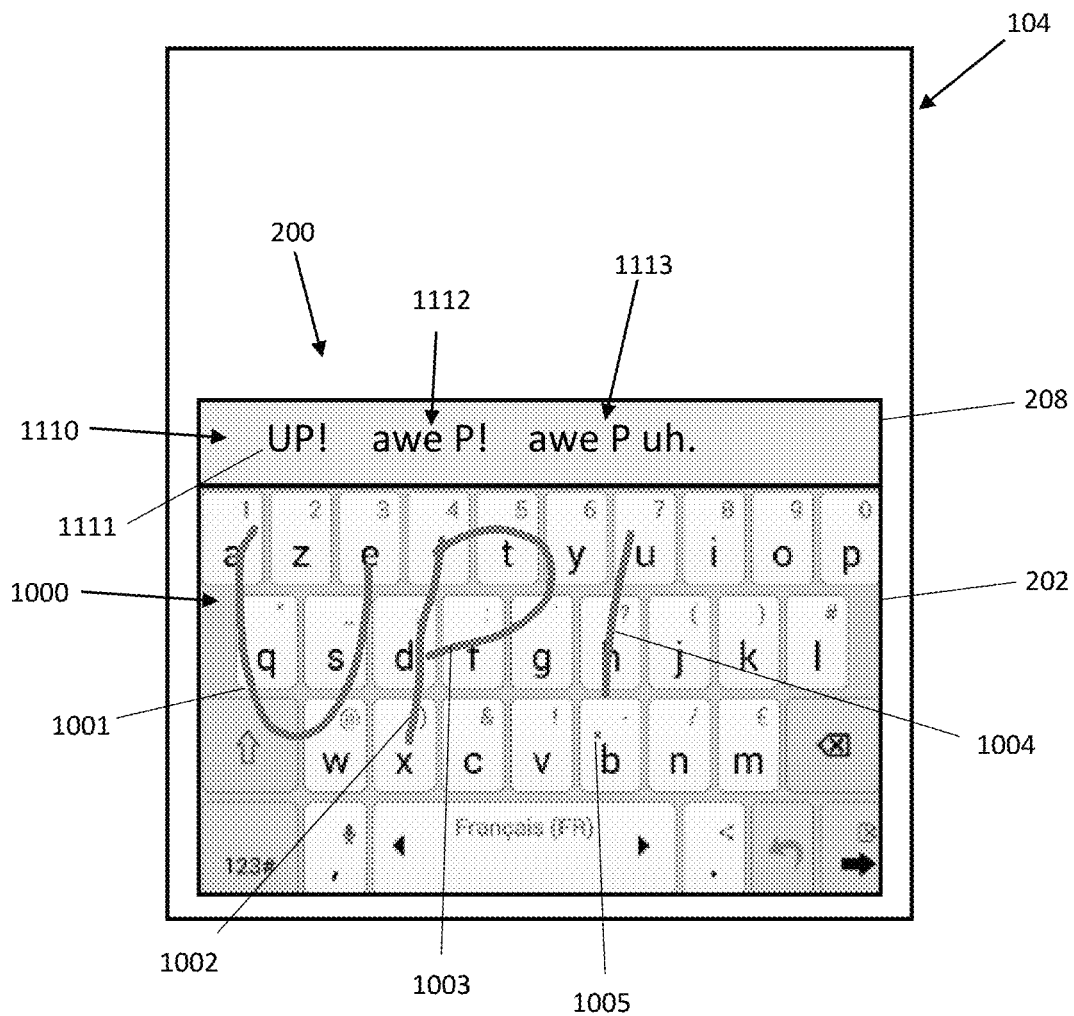
FIG. 11 shows the input area with display of alternative recognition candidates in the candidate area recognized from the received second type input of FIG. 10.

Like the afore-described probabilistic processes for touch-typing and handwriting, the stroke-typing recognition processing returns probability scores for the recognition candidates found. Accordingly, these scored stroke-typing recognition candidates are returned to the input management system 112 by the input recognition system 113 and handled with any scored touch-typing and handwriting recognition candidates to be provided as a direct recognition result for rendering in the display area 300 or as ranked or non-ranked members of the (ordered) candidate list rendered in the candidate area 208. FIG. 11 shows the example input of FIG. 10 with recognition candidates 1110 in the candidate area 208 of the input area 200. The candidate list 1110 includes a candidate 1111 being "UP!", a candidate 1112 being "awe P!" and a candidate 1113 being "awe P uh.".

The first candidate 1111 is the same as the candidate 1011 of FIG. 10. The second candidate 1112 corresponds to the recognized input candidate having the next highest probability or ranked score for all input types from both recognizers, and in particular, from both the HWR and KBR systems 114 and 115 where the input stroke 1001 is considered as stroke-typing input of the keys 204 corresponding to "awe", the input strokes 1002 and 1003 are considered as handwriting together to forming the character "P", the input strokes 1004 and 1005 are considered as handwriting together forming the character "!" based on the afore-described recognition processes used by the HWR and KBR systems, for example.

The third candidate 1113 corresponds to the recognized input candidate having the next highest probability score for all input types from both recognizers, and in particular, from both the HWR and KBR systems 114 and 115 where the input stroke 1001 is considered as stroke-typing input as in the second candidate, the input strokes 1002 and 1003 are considered as handwriting input as in the second candidate, the stroke 1004 is considered as stroke-typing input forming the word "uh", and the stroke 1005 is considered as handwriting input forming a period "." Based on the afore-described recognition processes used by the HWR and KBR systems, for example. It is noted like the earlier described recognition candidates, a 'space' is provided in the (mixed) candidates 1112 and 1113 between the recognized handwriting stroke-typing parts of the candidates.

The example input 500 of FIG. 5 includes a single input stroke forming a symbol and the example input 1000 of FIGS. 10 and 11 includes multiple input strokes forming alphabetic characters and a grammatical mark. In either case, each input stroke is segmented and otherwise analyzed by the recognizers 114 and 115 to provide the described recognition results. Other input or variations of these inputs formed from single and multiple strokes are handle in similar fashion. For example, FIGS. 12 to 15 shows the input panel 202 displaying the keyboard layout of FIG. 2 with various example handwritten input types rendered in digital ink with corresponding recognition candidate lists displayed in the candidate area 208 of the input area 200 as recognized by the input management system 112.

Figure 12:
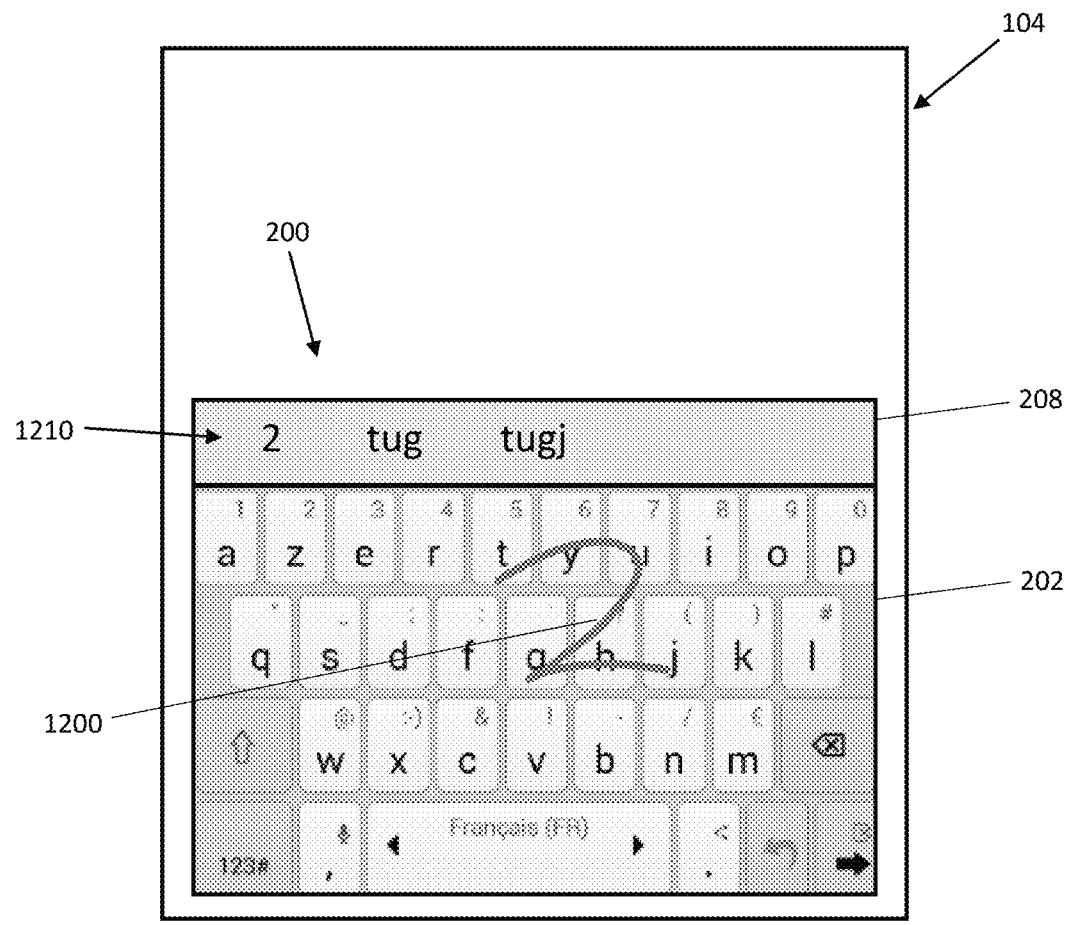
FIG. 12 shows the input area with a depiction of example received second type input and consequential display of recognition candidates in the candidate area.

In FIG. 12, input 1200 is a single handwritten stroke forming the numerical character "2" which passes over several content keys of the displayed keyboard such that a candidate list 1210 is displayed including the handwriting recognition candidate of "2" and the lower scored or ranked stroke-typing candidates "tug" and "tugj".

Figure 13:
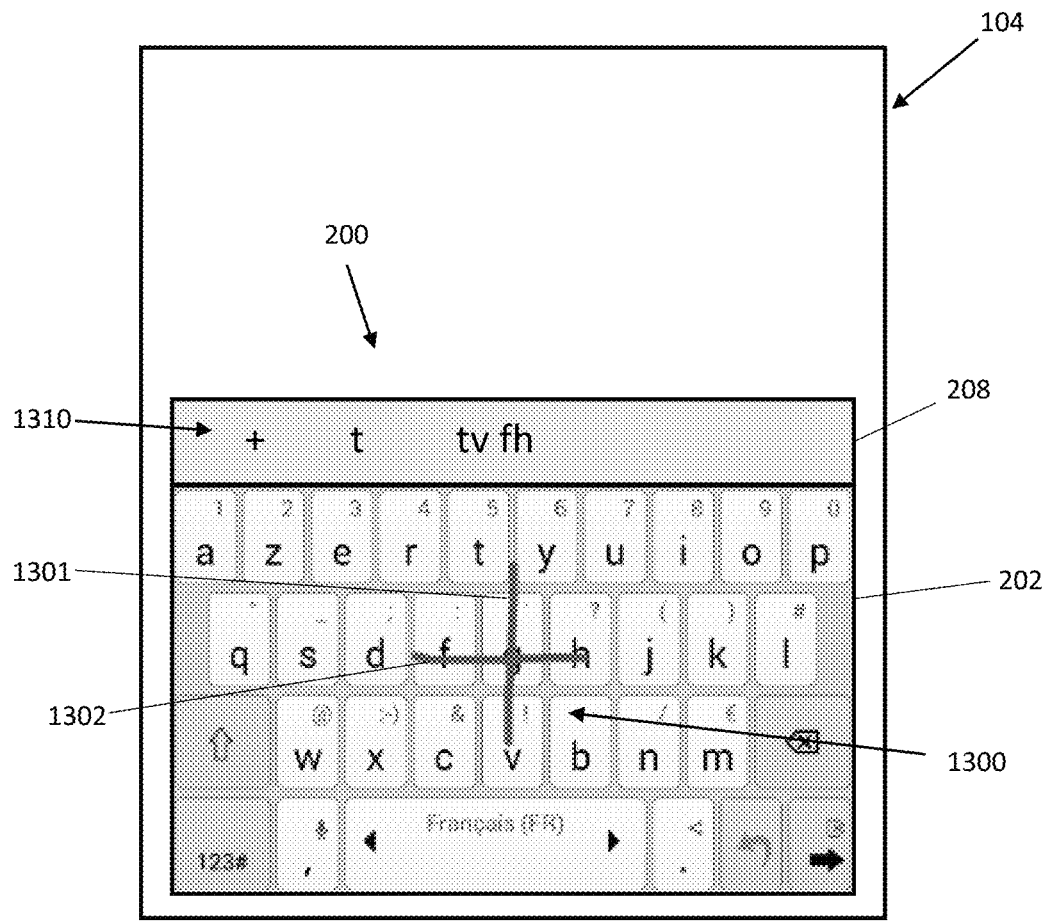
FIG. 13 shows the input area with a depiction of example received second type input and consequential display of recognition candidates in the candidate area.

In FIG. 13, input 1300 has multiple handwritten strokes 1301 and 1302 forming the mathematical symbol "+" which passes over several content keys of the displayed keyboard such that a candidate list 1310 is displayed including the handwriting recognition candidate of "+" and the lower scored or ranked stroke-typing candidates "t" and "tv fh".

Figure 14:
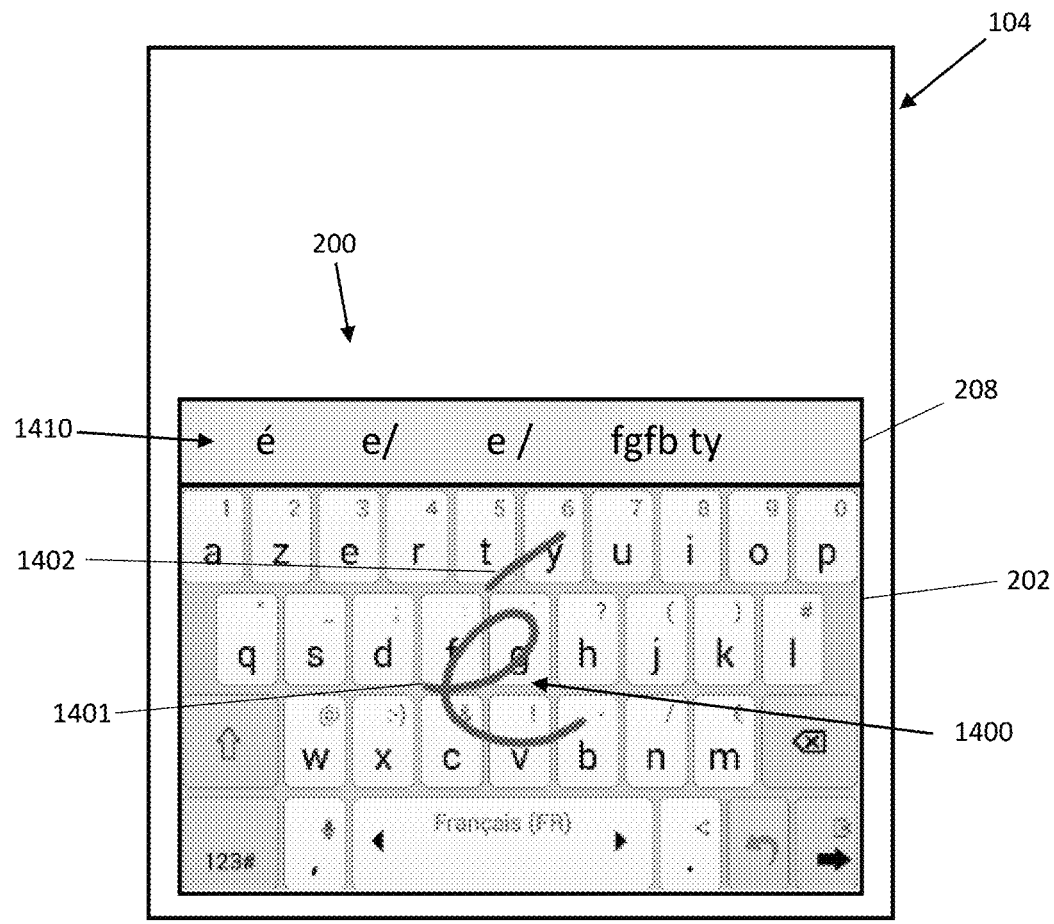
FIG. 14 shows the input area with a depiction of example received second type input and consequential display of recognition candidates in the candidate area.

In FIG. 14, input 1400 has multiple handwritten strokes 1401 and 1402 forming the accented alphabetic character "é" which passes over several content keys of the displayed keyboard such that a candidate list 1410 is displayed including the handwriting recognition candidate of "é" and the lower scored or ranked handwriting candidates "e/" and "e /" and stroke-typing candidate "fgfb ty".

Figure 15:
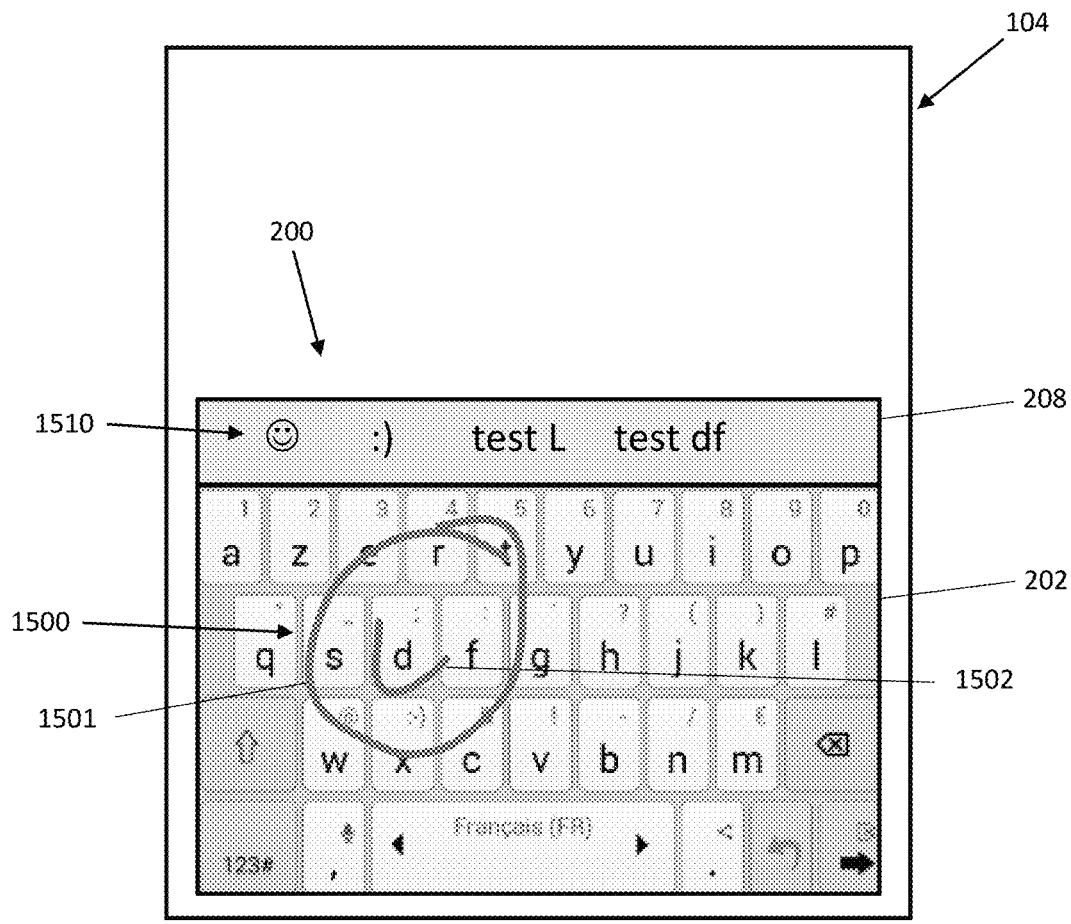
FIG. 15 shows the input area with a depiction of example received second type input and consequential display of recognition candidates in the candidate area.

In FIG. 15, input 1500 has multiple handwritten strokes 1501 and 1502 forming the emoji "☺" (so-called "happy face") which passes over several content keys of the displayed keyboard such that a candidate list 1510 is displayed including the handwriting recognition candidate of "☺" and the lower scored or ranked handwriting candidate ":)" (the ASCII form of the emoji) and stroke-typing candidates "test L" and "test df".

In the examples of FIGS. 10 to 15 three or four recognition candidates are shown in the candidate lists. More or less candidates may be rendered for display however depending on the number and length of probable candidates returned by the input recognition system 113 and the display dimensions of the interface surface 104 of the digital device 100. The display of the recognition candidates to the user during input is made to provide the user with recognition feedback and with the option to choose a recognition result that is not the most highly scored or ranked after recognition. This choice is provided through allowing interaction with the displayed candidates.

Figure 16A:
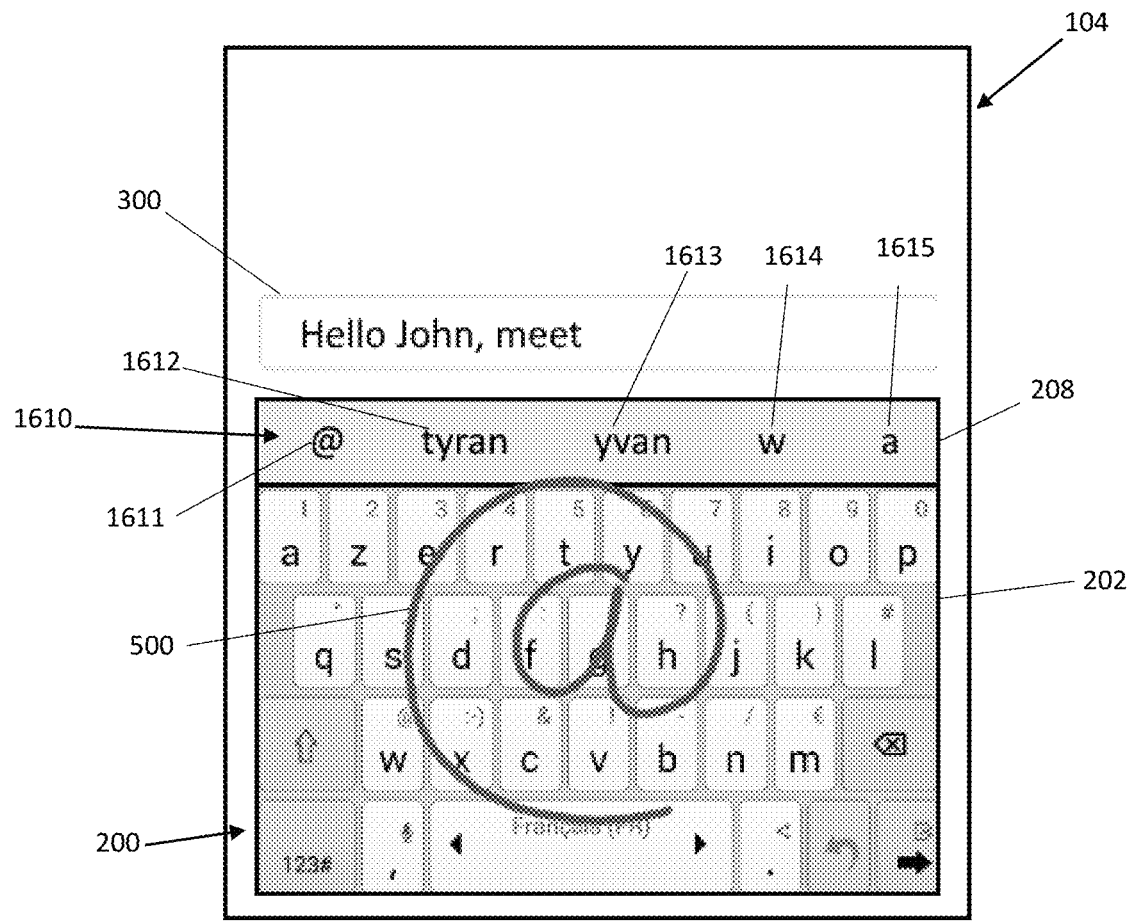
FIG. 16A shows the display of recognition candidates in the candidate area recognized from the received second type input of FIG. 5.
Figure 16B:
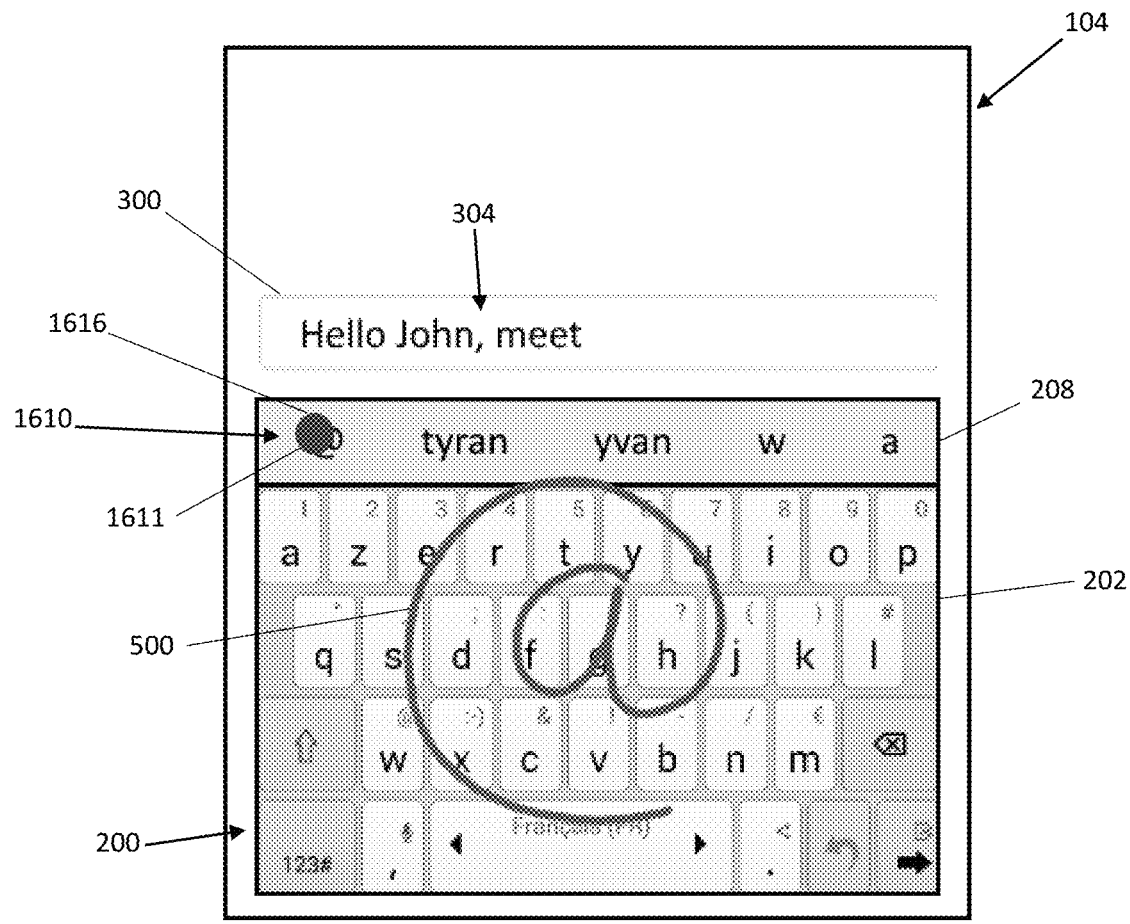
FIG. 16B shows the candidate area of FIG. 16A with a depiction of example received input of a third type.

For example, FIG. 16A shows the example handwritten input 500 of FIG. 5 for which a recognition candidate list 1610 is displayed in the candidate display area 208. The ordered candidate list 1610 includes a first handwritten candidate 1611 of "@", a second stroke-typing candidate 1612 of "tyran", a third stroke-typing candidate 1613 of "yvan", a fourth handwritten candidate 1614 of "a" and a fifth handwritten candidate 1614 of "w" based on the scored and/or ranked recognition results returned by the input recognition system 113, each rendered as digital objects in typeset ink. As each of the displayed candidates 1611 to 1615 are digital objects interaction is possible through user gestures on or over the interface surface 104. For example, FIG. 16B shows an interaction 1616, such as a tap, with the first candidate 1611. The input management system 112 interprets the interaction 1616 as being user selection of the first candidate 1611 as the correct recognized content. In response to this interpretation the input management system 112 causes the content input 304 in the content display area 300 to be updated corresponding to "Hello John, meet @", as shown in FIG. 9, for example.

The available interactions with the candidate display area 208 may also include the ability to horizontally scroll in the candidate area 208 through input of a multiple-point gesture, like swiping, in order to 'reveal' display of further recognition candidates in the candidate area 208, e.g., candidates having lower scores and/or ranks of probability. Other interactions, such as long press, with displayed recognition candidates may also be supported by the input management system 112 for launching other functions, such as menu launching for re-performing recognition, language selection, display of language variants, selection of the input as a command rather than content.

If no interaction with the displayed candidates is received the highest scored recognition candidate is used to update the display content 304, for example, after a certain length of time of input receipt (e.g., about 0.5 seconds to about 1.0 second). Further, as soon as new typing input is received the highest scored recognition candidate is used to update the display content 304. In either case, once the input content 304 is updated with the automatically or manually selected recognition candidate, the currently displayed recognition candidates are removed from the candidate area.

While the above-described examples provide a list of recognition candidates, the present system and method need not provide this candidate list to users during input. Rather, the candidates may be made accessible to users through command gesture(s) to launch a menu or the like, or the list removed from display upon detection of command input, for example. Further, the candidate list need not be provided at all, instead each top scoring or ranking candidate from the input recognition system may be used as the recognition results and displayed directly as the recognized content in the content display area as in the example of FIG. 9.

The present system and method causes recognition of content and commands from multiple-types of input: typing, stroke-typing and handwriting, without use of explicit input modes and with the ability for content to be formed from various combinations of these input types. The different modes of input are allowed using a single input panel, thus avoiding the need to change an active input panel to enter different modal input or special symbols and characters, like emojis. leading to faster entry and recognition processing of content. As such, users are enabled to enter content mixing traditional keyboard typing, handwriting and even modern keyboard stroke-like typing, to allow true mobility in content and device command input with a dramatic reduction in effort and increase in productivity. The present system and method provides the recognition of content and control input regardless of the input type used. The different input types are not used to hone recognition of one or more of the input types but to allow users to provide input in any manner they desire in any situation without loss of recognition accuracy or speed, thereby dramatically increasing productivity.

While the foregoing has described what are considered to be the best mode and/or other examples, it is understood that various modifications may be made therein and that the subject matter disclosed herein may be implemented in various forms and examples, and that they may be applied in numerous other applications, combinations, and environments, only some of which have been described herein. Those of ordinary skill in that art will recognize that the disclosed aspects may be altered or amended without departing from the true spirit and scope of the subject matter. Therefore, the subject matter is not limited to the specific details, exhibits, and illustrated examples in this description. It is intended to protect any and all modifications and variations that fall within the true scope of the advantageous concepts disclosed herein.

We claim:

1. A system for recognizing input of multiple input types on computing devices, each computing device comprising a processor and at least one non-transitory computer readable medium storing instructions that, when executed by the processor, cause the processor to:
cause display of, on a portion of an interface surface of a computing device, a layout of character keys as a keyboard;
accept, at the portion of the interface surface, an input;
recognize the accepted input as i) a first recognized object corresponding to a
handwriting type of input by a handwriting recognition system, wherein the handwriting type of input comprises an input recognition to the user interface on the same portion of the interface surface where the keyboard is displayed and the keyboard as an input is disregarded, ii) a second recognized object corresponding to a touch typing type of input by a keyboard recognition system, or iii) a third recognized object corresponding to a stroke typing type of input by the keyboard recognition system;
assign, based on determining whether the accepted input forms a handwritten character with one or more prior inputs having been input prior to accepting the accepted input, i) a first probability score to the first recognized object, ii) a second probability score to the second recognized object, and iii) a third probability score to the third recognized object, wherein the first probability score the second probability score, and the third probability score each differ from each other;
generate a list of candidates including the first recognized object, the second recognized object, and the third recognized object, the first recognized object, the second recognized object, and the third recognized object being ranked based on the first probability score assigned to the first recognized object, the second probability score assigned to the second recognized object, and the third probability score assigned to the third recognized object; and
return at least one of: the first recognized object, the second recognized object or the third recognized object, for a recognized object of the accepted input, based on the first probability score assigned to the first recognized object, the second probability score assigned to the second recognized object, or the third probability score assigned to the third recognized object.

2. The system according to claim 1, wherein the accepted input corresponds to different types of input including single-position interactions and multi-position interactions with respect to the interface surface.

3. The system according to claim 2, wherein the single-position interactions correspond to positions of the keys and the multi-position interactions correspond to strokes through positions of a plurality of the keys.

4. A method for recognizing input of multiple input types on computing devices, each computing device comprising a processor and at least one non-transitory computer-readable medium for recognizing input under control of the processor, the method comprising:
causing display of, on a portion of an interface surface of a computing device, a layout of character keys as a keyboard;
accepting, at the portion of the interface surface, an input comprising different types of input;

recognizing the accepted input as i) a first recognized object corresponding to a handwriting type of input by a handwriting recognition system, wherein the handwriting type of input comprises an input recognition to the user interface on the same portion of the interface surface where the keyboard is displayed, ii) a second recognized object corresponding to a touch typing type of input by a keyboard recognition system, or iii) a third recognized object corresponding to a stroke typing type of input by the keyboard recognition system;

assigning, based on determining whether the accepted input forms a handwritten character with one or more prior inputs having been input prior to accepting the accepted input, i) a first probability score to the first recognized object, ii) a second probability score to the second recognized object, and iii) a third probability score to the third recognized object, wherein the first probability score the second probability score, and the third probability score each differ from each other;

generating a list of candidates including the first recognized object, the second recognized object, and the third recognized object, the first recognized object, the second recognized object, and the third recognized object being ranked based on the first probability score assigned to the first recognized object, the second probability score assigned to the second recognized object, and the third probability score assigned to the third recognized object; and returning at least one of: the first recognized object, the second recognized object or the third recognized object, for a recognized object of the accepted input, based on the first probability score assigned to the first recognized object, the second probability score assigned to the second recognized object, or the third probability score assigned to the third recognized object.

5. The method according to claim 4, wherein the different types of input include single-position interactions and multi-position interactions with respect to the interface surface.

6. The method according to claim 5, wherein the single-position interactions correspond to positions of the keys and the multi-position interactions correspond to strokes through positions of a plurality of the keys.

7. A non-transitory computer readable medium having a computer-readable program code embodied therein, said computer-readable program code adapted to be executed to implement a method for recognizing input of multiple input types on a computing device, the computing device comprising a processor and at least one system non-transitory computer-readable medium for recognizing the input under control of the processor, the method comprising:

causing display of, on a portion of an interface surface of a computing device, a layout of character keys as a keyboard;

accepting, at the portion of the interface surface, an input;

recognizing the accepted input as i) a first recognized object corresponding to a handwriting type of input by a handwriting recognition system, wherein the handwriting type of input comprises an input recognition to the user interface on the same portion of the interface surface where the keyboard is displayed, ii) a second recognized object corresponding to a touch typing type of input by a keyboard recognition system, or iii) a third recognized object corresponding to a stroke typing type of input by the keyboard recognition system;

assigning, based on determining whether the accepted input forms a handwritten character with one or more prior inputs having been input prior to accepting the accepted input, i) a first probability score to the first recognized object, ii) a second probability score to the second recognized object, and iii) a third probability score to the third recognized object, wherein the first probability score, the second probability score, and the third probability score each differ from each other;

generating a list of candidates including the first recognized object, the second recognized object, and the third recognized object, the first recognized object, the second recognized object, and the third recognized object being ranked based on the first probability score assigned to the first recognized object, the second probability score assigned to the second recognized object, and the third probability score assigned to the third recognized object; and returning at least one of: the first recognized object, the second recognized object, or the third recognized object, for a recognized object of the accepted input, based on the first probability score assigned to the first recognized object, the second probability score assigned to the second recognized object, or the third probability score assigned to the third recognized object.

8. The non-transitory computer readable medium according to claim 7, wherein the accepted input corresponds to different types of input including single-position interactions and multi-position interactions with respect to the interface surface.

9. The non-transitory computer readable medium according to claim 8, wherein the single-position interactions correspond to positions of the keys and the multi-position interactions correspond to strokes through positions of a plurality of the keys.

* * * * *